US012675878B2

(12) United States Patent
Sasuga et al.

(10) Patent No.: US 12,675,878 B2
(45) Date of Patent: Jul. 7, 2026

(54) MEDICAL IMAGE PROCESSING APPARATUS, MEDICAL IMAGE PROCESSING METHOD, AND PROGRAM

(71) Applicant: FUJIFILM Corporation, Tokyo (JP)

(72) Inventors: Saeko Sasuga, Tokyo (JP); Rena Kamoda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 18/452,565

(22) Filed: Aug. 21, 2023

(65) Prior Publication Data

US 2023/0401709 A1 Dec. 14, 2023

Related U.S. Application Data

(63) Continuation of application No. PCT/JP2022/006045, filed on Feb. 16, 2022.

(30) Foreign Application Priority Data

Feb. 22, 2021 (JP) ................................. 2021-026333
Jun. 21, 2021 (JP) ................................. 2021-102168

(51) Int. Cl.
*G06T 7/00* (2017.01)
*G06T 7/11* (2017.01)
*G06T 7/50* (2017.01)

(52) U.S. Cl.
CPC .............. *G06T 7/0012* (2013.01); *G06T 7/11* (2017.01); *G06T 7/50* (2017.01);
(Continued)

(58) Field of Classification Search
CPC ....... A61B 6/5217; G06T 7/0012; G06T 7/11; G06T 7/50; G06T 7/62; G06T 19/00;
(Continued)

(56) References Cited

U.S. PATENT DOCUMENTS

| | | | |
|---|---|---|---|
| 5,782,762 | A | 7/1998 | Vining |
| 6,083,162 | A | 7/2000 | Vining |

(Continued)

FOREIGN PATENT DOCUMENTS

| | | |
|---|---|---|
| JP | H10507954 | 8/1998 |
| JP | 2009072433 | 4/2009 |

(Continued)

OTHER PUBLICATIONS

"Search Report of Europe Counterpart Application", issued on Jun. 26, 2024, p. 1-p. 7.

(Continued)

*Primary Examiner* — Katrina R Fujita
(74) *Attorney, Agent, or Firm* — JCIPRNET

(57) ABSTRACT

There are provided a medical image processing apparatus, a medical image processing method, and a program capable of presenting distance information that is useful for lesion evaluation together with a medical image. A medical image processing apparatus according to an aspect of the present disclosure includes a processor and a storage device. The processor is configured to, by executing a command of a program stored in the storage device, acquire a three-dimensional medical image, receive an input of information indicating a lesion region included in the medical image, determine, from the medical image, a measurement reference surface serving as a measurement reference for lesion evaluation, three-dimensionally measure a distance between the lesion region and the measurement reference surface, and display a measurement result including information indicating at least one of a closest distance or a farthest distance between the lesion region and the measurement reference surface together with the medical image.

27 Claims, 16 Drawing Sheets

280

282

(52) U.S. Cl.
CPC ............... *G06T 2207/10088* (2013.01); *G06T 2207/20081* (2013.01); *G06T 2207/20104* (2013.01); *G06T 2207/30096* (2013.01); *G06T 2207/30172* (2013.01)

(58) Field of Classification Search
CPC . G06T 2207/10088; G06T 2207/20104; G06T 2207/30096; G06T 2210/41
See application file for complete search history.

(56) References Cited

U.S. PATENT DOCUMENTS

| | | | |
|---|---|---|---|
| 6,272,366 B1 | 8/2001 | Vining | |
| 6,909,913 B2 | 6/2005 | Vining | |
| 7,792,565 B2 | 9/2010 | Vining | |
| 8,036,439 B2 | 10/2011 | Moriya | |
| 8,145,292 B2 | 3/2012 | Vining | |
| 10,430,946 B1* | 10/2019 | Zhou .................. | A61B 5/02007 |
| 11,024,031 B1* | 6/2021 | Nozaki ............... | A61B 1/2736 |
| 12,048,413 B2* | 7/2024 | Tada .................. | A61B 1/00009 |
| 2010/0135555 A1* | 6/2010 | Kobayashi ........... | G06T 7/0012 |
| | | | 382/128 |
| 2012/0250966 A1 | 10/2012 | Fujisawa et al. | |
| 2014/0085453 A1* | 3/2014 | Yamane ............... | A61B 5/742 |
| | | | 345/593 |
| 2014/0303486 A1* | 10/2014 | Baumgartner ......... | A61B 5/055 |
| | | | 600/414 |
| 2015/0117730 A1* | 4/2015 | Takayama ........... | G02B 21/367 |
| | | | 382/128 |
| 2015/0119722 A1* | 4/2015 | Kaneko ............... | A61B 1/043 |
| | | | 600/476 |
| 2015/0199945 A1* | 7/2015 | Yamane ............... | G06T 11/00 |
| | | | 345/634 |
| 2015/0294462 A1 | 10/2015 | Yin et al. | |
| 2016/0038252 A1* | 2/2016 | Barth, Jr. ............. | G06T 7/33 |
| | | | 600/424 |
| 2017/0119292 A1 | 5/2017 | Ueda et al. | |
| 2019/0050665 A1 | 2/2019 | Sakuragi | |
| 2019/0236779 A1* | 8/2019 | Hattori .................. | G01N 15/00 |
| 2020/0085382 A1* | 3/2020 | Taerum ............... | A61B 5/7264 |
| 2021/0153808 A1* | 5/2021 | Tada ................... | G06T 7/0016 |
| 2021/0209755 A1* | 7/2021 | Mishra ................ | G06T 7/90 |
| 2022/0020496 A1* | 1/2022 | Saito .................. | G06T 7/0012 |
| 2022/0133214 A1* | 5/2022 | Shino ................. | H04N 1/3875 |
| | | | 600/477 |

FOREIGN PATENT DOCUMENTS

| | | |
|---|---|---|
| JP | 2011152323 | 8/2011 |
| JP | 2015217012 | 12/2015 |
| JP | 2016039874 | 3/2016 |
| JP | 2016093531 | 5/2016 |
| JP | 2016202918 | 12/2016 |
| WO | 2017179350 | 10/2017 |

OTHER PUBLICATIONS

"International Search Report (Form PCT/ISA/210) of PCT/JP2022/006045", mailed on May 10, 2022, with English translation thereof, pp. 1-5.

"Written Opinion of the International Searching Authority (Form PCT/ISA/237) of PCT/ JP2022/006045", mailed on May 10, 2022, with English translation thereof, pp. 1-8.

"Notice of Reasons for Refusal of Japan Counterpart Application", issued on Nov. 7, 2025, with English translation thereof, p. 1-p. 11.

"Notice of Reasons for Refusal of Japan Counterpart Application", issued on Mar. 30, 2026, with English translation thereof, p. 1-p. 6.

* cited by examiner

FIG. 2

EXTRAMURAL DEPTH OF TUMOR INVASION

INVASION DEPTH: T3

ME

TU

MP

B

CANCER

MUSCULARIS PROPRIA

MESORECTUM

Figure 5:
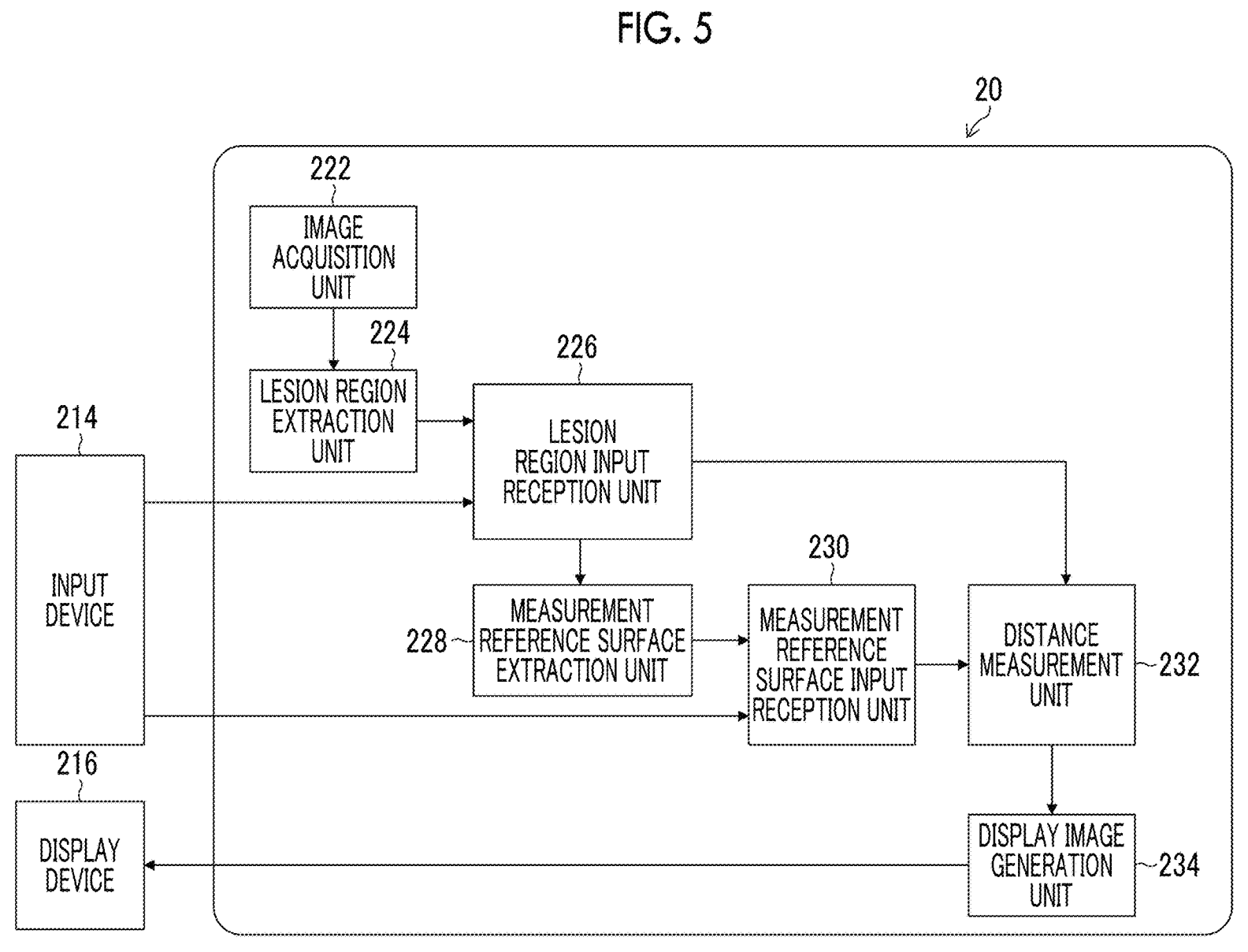

222 — IMAGE ACQUISITION UNIT

224 — LESION REGION EXTRACTION UNIT

226 — LESION REGION INPUT RECEPTION UNIT

228 — MEASUREMENT REFERENCE SURFACE EXTRACTION UNIT

230 — MEASUREMENT REFERENCE SURFACE INPUT RECEPTION UNIT

232 — DISTANCE MEASUREMENT UNIT

234 — DISPLAY IMAGE GENERATION UNIT

214 — INPUT DEVICE

216 — DISPLAY DEVICE

FIG.7

MEDICAL IMAGE PROCESSING APPARATUS, MEDICAL IMAGE PROCESSING METHOD, AND PROGRAM

CROSS-REFERENCE TO RELATED APPLICATIONS

The present application is a Continuation of PCT International Application No. PCT/JP2022/006045 filed on Feb. 16, 2022 claiming priorities under 35 U.S.C. § 119(a) to Japanese Patent Application No. 2021-026333 filed on Feb. 22, 2021 and Japanese Patent Application No. 2021-102168 filed on Jun. 21, 2021. Each of the above applications is hereby expressly incorporated by reference, in its entirety, into the present application.

BACKGROUND OF THE INVENTION

1. Field of the Invention

The present disclosure relates to a medical image processing apparatus, a medical image processing method, and a program, and more particularly to an image processing technique and a user interface technique for handling a three-dimensional medical image.

2. Description of the Related Art

JP2016-202918A describes a medical image processing apparatus that accurately determines invasion of a tumor into a tubular tissue such as a bronchus or a blood vessel. JP1998-507954A (JP-H10-507954A) describes a method of representing an organ selected for medical observation or the like by three-dimensional rendering, and describes, as a method useful for monitoring tumors and the like, a method of measuring a distance and the like and measuring a cross-section region from a three-dimensional image.

JP2009-072433A describes a medical image processing apparatus that extracts a contour of a lesion in a medical image and measures a length or the like of the lesion based on the contour of the lesion. JP2016-39874A describes an endoscope image diagnosis support apparatus that performs contour display of a distance distribution from a bronchial wall to a lesion outside a bronchus on a volume rendering image.

SUMMARY OF THE INVENTION

In a case of cancers that develop from epithelial cells, particularly, in a case of cancers that develop in a digestive tract, such as a colorectal cancer, the cancer invades surrounding tissues as the cancer progresses. Cancer is classified into multiple stages according to a degree of progress. In evaluation of a degree of progress, a stage of a degree of progress of the cancer is determined depending on how far a primary tumor has invaded a plurality of layers and other organs serving as a reference, and a treatment method is selected based on the determined stage. For example, a colorectal cancer is divided into stages such as T1$a$, T1$b$, T2, T3, T4$a$, and T4$b$ depending on a degree of invasion into a region serving as a reference, such as a mucous membrane, a submucous membrane, a muscularis propria, a subserous membrane, and other surrounding organs.

T1$a$ is a state where the cancer remains in a submucous membrane and an invasion distance is shorter than 1 mm. T1$b$ is a state where the cancer remains in a submucous membrane, an invasion distance is equal to or longer than 1 mm, but the cancer does not reach a muscularis propria. T2 is a state where the cancer invades a muscularis propria and does not invade beyond the muscularis propria. T3 is a state where the cancer invades beyond the muscularis propria, remains in the subserous membrane at a site having a serous membrane, and remains in an outer membrane at a site without a serous membrane. T4$a$ is a state where the cancer is in contact with a surface of the serous membrane or breaks through the surface of the serous membrane and is exposed to the abdominal cavity. T4$b$ is a state where the cancer directly invades another organ.

In cancers that require determination of the invasion depth in this way, in a case of rectal cancer, attention is focused not only on whether or not the cancer has invaded a tissue serving as a reference, but also on a distance between the tissue serving as a reference and the cancer. In guidelines of the Europe and the United States, it is recommend to measure the following indicators on a high-resolution magnetic resonance imaging (MRI) image.

[1] Circumferential Resection Merging (CRM)

CRM is a closest distance between a deepest portion of the cancer and an exfoliated surface (mesorectum) surrounding the rectum. A case where the distance is equal to or shorter than 1 mm is defined as positive. CRM is regarded as a strong predictive factor of local recurrence.

[2] Extramural Depth of Tumor Invasion

The extramural depth of tumor invasion is a distance that the cancer invades beyond the intestinal tract wall (muscularis propria). Classes are divided into 3 stages or 4 stages according to the distance. It is known that the medical image processing apparatus tends to have poor prognosis in a case where the extramural depth of tumor invasion increases. For this reason, a necessity of chemotherapy according to the distance has been discussed.

[Problem 1] CRM as an indicator for determining a degree of progress of the cancer is evaluated based on the mesorectum, and the extramural depth of tumor invasion is evaluated based on the muscularis propria. In this way, a tissue serving as a reference for evaluation and a surface serving as a reference for measurement (hereinafter, referred to as "measurement reference surface") differ depending on the degree of progress of the cancer. In this regard, in the endoscope image diagnosis support apparatus described in JP2016-39874A, in a case where a tissue sample of a region of interest is collected using a puncture needle provided at a tip of the endoscope, the purpose is to recognize a distance between the tip of the endoscope and the region of interest. Thus, a projection image is generated by projecting the region of interest onto an inner wall of the bronchus by using, as a reference, a specific point which is set inside the bronchus. The technique described in JP2016-39874A has a configuration of measuring a distance from the same specific reference to the region of interest. As a result, the technique cannot be used for determining a degree of progress of the cancer or the like, and it is difficult to perform adaptive distance measurement according to the degree of progress of the cancer.

[Problem 2] In a case where a doctor determines a degree of progress of a cancer, it is desired to confirm a positional relationship (in particular, a closest portion and/or a farthest portion) between a region of the cancer and a surrounding tissue or a measurement reference surface on an actual medical image such as a computed tomography (CT) image or an MRI image and confirm a distance by an indicator such as CRM or the extramural depth of tumor invasion. In this regard, the endoscope image diagnosis support apparatus described in JP2016-39874A has a configuration of performing contour display on a volume rendering image. However, numerical information indicating a measured distance, information indicating a measurement portion of the distance, and the like are not displayed on an actual medical image. As a result, it is difficult to recognize a state of a portion at which the distance between the cancer and the measurement reference surface is close on the actual medical image.

[Problem 3] Further, the measurement reference surface is not limited to an outer circumference surface of an anatomically-existing tissue or a boundary surface between tissues. It is considered that an arbitrary surface freely designated by a doctor or the like is used as the measurement reference surface. For example, in a case where a doctor examines a resection surface in a resection plan before surgery, a virtual surface to be resected may be designated on a medical image. In this way, there is also a demand for a form of utilization in which a distance from an arbitrarily-designated surface to the cancer can be confirmed in advance.

The present disclosure has been made in view of such circumstances, and an object of the present disclosure is to provide a medical image processing apparatus, a medical image processing method, and a program capable of resolving at least one problem among a plurality of problems described above and presenting distance information that is useful for lesion evaluation together with a medical image.

According to an aspect of the present disclosure, there is provided a medical image processing apparatus including: a processor; and a storage device that stores a program to be executed by the processor, in which the processor is configured to: by executing a command of the program, acquire a three-dimensional medical image, receive an input of information indicating a lesion region included in the medical image, determine, from the medical image, a measurement reference surface serving as a measurement reference for lesion evaluation, three-dimensionally measure a distance between the lesion region and the measurement reference surface, and display a measurement result including information indicating at least one of a closest distance or a farthest distance between the lesion region and the measurement reference surface together with the medical image.

The "measurement for lesion evaluation" includes, for example, measurement for determining a degree of progress (malignancy) of a lesion, measurement for determining a stage of a lesion, measurement for determining a validity of a resection region, and the like. The "information indicating the lesion region" may be information related to the entire region of the lesion region or information related to a partial region (certain region) of the lesion region. For example, the information indicating the lesion region may be only information of a region required for measurement.

According to the aspect, it is possible to select an appropriate measurement reference surface according to an extent of spread of a lesion, measure a three-dimensional distance that is useful for lesion evaluation, and simultaneously display distance information in the measurement result together with the medical image.

In the medical image processing apparatus according to another aspect of the present disclosure, the processor is configured to determine, as one of the measurement reference surfaces, a first measurement reference surface outside the lesion region, and display the measurement result including information indicating the closest distance and a closest portion between the first measurement reference surface and the lesion region.

In the medical image processing apparatus according to still another aspect of the present disclosure, the processor is configured to determine, as one of the measurement reference surfaces, a second measurement reference surface intersecting with the lesion region, and display the measurement result including information indicating the farthest distance and a farthest portion between a portion of the lesion region that invades beyond the second measurement reference surface and the second measurement reference surface.

In the medical image processing apparatus according to still another aspect of the present disclosure, the processor is configured to determine, from the lesion region, a lesion-region-side measurement reference region serving as a lesion-region-side reference of the measurement for the lesion evaluation, and measure a distance between the lesion-region-side measurement reference region and the measurement reference surface.

In the medical image processing apparatus according to still another aspect of the present disclosure, the lesion-region-side measurement reference region may be a partial region of the lesion region.

In the medical image processing apparatus according to still another aspect of the present disclosure, the processor is configured to determine, as the measurement reference surfaces, a first measurement reference surface outside the lesion region and a second measurement reference surface intersecting with the lesion region, determine, from a region that is included in the lesion region and is inside the first measurement reference surface and outside the second measurement reference surface, a lesion-region-side measurement reference region serving as a lesion-region-side reference of the measurement for the lesion evaluation, and measure a distance between at least one of the first measurement reference surface or the second measurement reference surface and the lesion-region-side measurement reference region.

The lesion-region-side measurement reference region may be an entire region or a partial region of the lesion region that is inside the first measurement reference surface and outside the second measurement reference surface. For example, the lesion-region-side measurement reference region may be an outer circumference surface of a region of the lesion region that is inside the first measurement reference surface and outside the second measurement reference surface.

In the medical image processing apparatus according to still another aspect of the present disclosure, the processor is configured to measure a distance between the first measurement reference surface and the lesion-region-side measurement reference region, and display the measurement result including information indicating the closest distance between the first measurement reference surface and the lesion-region-side measurement reference region together with the medical image.

In the medical image processing apparatus according to still another aspect of the present disclosure, the lesion-region-side measurement reference region is a region corresponding to at least a portion of an outer circumference surface of the lesion region.

In the medical image processing apparatus according to still another aspect of the present disclosure, the processor is configured to determine, as one of the measurement reference surfaces, a first measurement reference surface outside the lesion region, and display, in a case where a distance between the first measurement reference surface and the lesion-region-side measurement reference region is shorter than a first threshold value, information indicating that the distance is shorter than the first threshold value together with the medical image.

In the medical image processing apparatus according to still another aspect of the present disclosure, the processor is configured to determine, as one of the measurement reference surfaces, a second measurement reference surface intersecting with the lesion region, and display, for a portion at which a distance between the second measurement reference surface and the lesion-region-side measurement reference region is equal to or longer than a second threshold value, information indicating that the distance is equal to or longer than the second threshold value together with the medical image.

In the medical image processing apparatus according to still another aspect of the present disclosure, the measurement result includes at least one of a numerical value indicating a distance, a color map representing the distance using a color, or information indicating a determination result as to whether or not the distance exceeds a threshold value.

In the medical image processing apparatus according to still another aspect of the present disclosure, the processor is configured to perform lesion region extraction processing of automatically extracting the lesion region from the medical image, and acquire the information indicating the lesion region.

In the medical image processing apparatus according to still another aspect of the present disclosure, the lesion region extraction processing includes processing of extracting the lesion region by performing image segmentation using a model which is trained by machine learning.

In the medical image processing apparatus according to still another aspect of the present disclosure, the processor is configured to receive an input of the information indicating the lesion region which is designated by using an input device.

In the medical image processing apparatus according to still another aspect of the present disclosure, the measurement reference surface is a surface corresponding to a circumference surface of a tissue serving as a reference in determination of a degree of progress of a lesion.

In the medical image processing apparatus according to still another aspect of the present disclosure, the processor is configured to determine the measurement reference surface to be used for the measurement according to the lesion region from a plurality of measurement reference surface candidates which are available as the measurement reference surface.

In the medical image processing apparatus according to still another aspect of the present disclosure, the plurality of measurement reference surface candidates include a surface corresponding to a circumference surface of an anatomical tissue.

In the medical image processing apparatus according to still another aspect of the present disclosure, the lesion region is a region of a cancer that develops from epithelial cells, and the processor is configured to select an innermost non-invasion tissue which is a tissue having a region closest to the epithelial cells in a region outside a deepest portion of the cancer, and determine the measurement reference surface serving as a reference for measurement of the closest distance based on the selected innermost non-invasion tissue.

In the medical image processing apparatus according to still another aspect of the present disclosure, the processor is configured to select an outermost invasion tissue which is a tissue farthest from the epithelial cells among tissues which are invaded by the cancer in a region inside the deepest portion of the cancer, and determine the measurement reference surface serving as a reference for measurement of the farthest distance based on the selected outermost invasion tissue.

In the medical image processing apparatus according to still another aspect of the present disclosure, the processor is configured to receive an input of information indicating the measurement reference surface which is designated by using an input device.

In the medical image processing apparatus according to still another aspect of the present disclosure, the processor is configured to display a numerical value of the measurement result of at least one of the closest distance or the farthest distance.

In the medical image processing apparatus according to still another aspect of the present disclosure, the processor is configured to display a cross-section image of a plane including two points at which at least one distance of the closest distance or the farthest distance is measured.

In the medical image processing apparatus according to still another aspect of the present disclosure, the processor is configured to generate a cross-section image of a plane including two points at which the closest distance is measured, and display the cross-section image.

In the medical image processing apparatus according to still another aspect of the present disclosure, the lesion region is a region of a cancer that develops in a hollow organ, and the processor is configured to present, as a recommended cross-section, a plane which passes through two points at which the closest distance is measured and on which a cross-section area of a hollow organ is smallest or a plane which passes through two points at which the closest distance is measured and of which an angle with a centerline of the hollow organ is closest to 90 degrees.

The hollow organ may include, for example, a digestive tract, a trachea, or a blood vessel.

In the medical image processing apparatus according to still another aspect of the present disclosure, the processor is configured to, after presenting the recommended cross-section, receive an input of an instruction from a user to designate a plane passing through the two points by using an input device by fixing an axis passing through the two points at which the closest distance is measured, and generate a cross-section image of the designated plane.

According to still another aspect of the present disclosure, there is provided a medical image processing method including: causing a computer to execute: acquiring a three-dimensional medical image; receiving an input of information indicating a lesion region included in the medical image; determining, from the medical image, a measurement reference surface serving as a measurement reference for lesion evaluation; three-dimensionally measuring a distance between the lesion region and the measurement reference surface; and displaying a measurement result including information indicating at least one of a closest distance or a farthest distance between the lesion region and the measurement reference surface together with the medical image.

According to still another aspect of the present disclosure, there is provided a program causing a computer to realize: a function of acquiring a three-dimensional medical image; a function of receiving an input of information indicating a lesion region included in the medical image; a function of determining, from the medical image, a measurement reference surface serving as a measurement reference for lesion evaluation; a function of three-dimensionally measuring a distance between the lesion region and the measurement reference surface; and a function of displaying a measurement result including information indicating at least one of a closest distance or a farthest distance between the lesion region and the measurement reference surface together with the medical image.

According to the present invention, it is possible to adaptively select the measurement reference surface according to the lesion region, and display the distance information for lesion evaluation together with a medical image.

BRIEF DESCRIPTION OF THE DRAWINGS

FIG. 2 is a diagram illustrating an example in which an extramural depth of tumor invasion is measured from an MRI image obtained by imaging a patient with a rectal cancer.

FIG. 5 is a functional block diagram of a medical image processing apparatus according to an embodiment.

FIG. 7 is a block diagram illustrating a configuration example of the medical image processing apparatus according to the embodiment.

DESCRIPTION OF THE PREFERRED EMBODIMENTS

Hereinafter, preferred embodiments of the present invention will be described with reference to the accompanying drawings.

<<Example of Distance Measurement in Rectal Cancer>>

Figure 1:
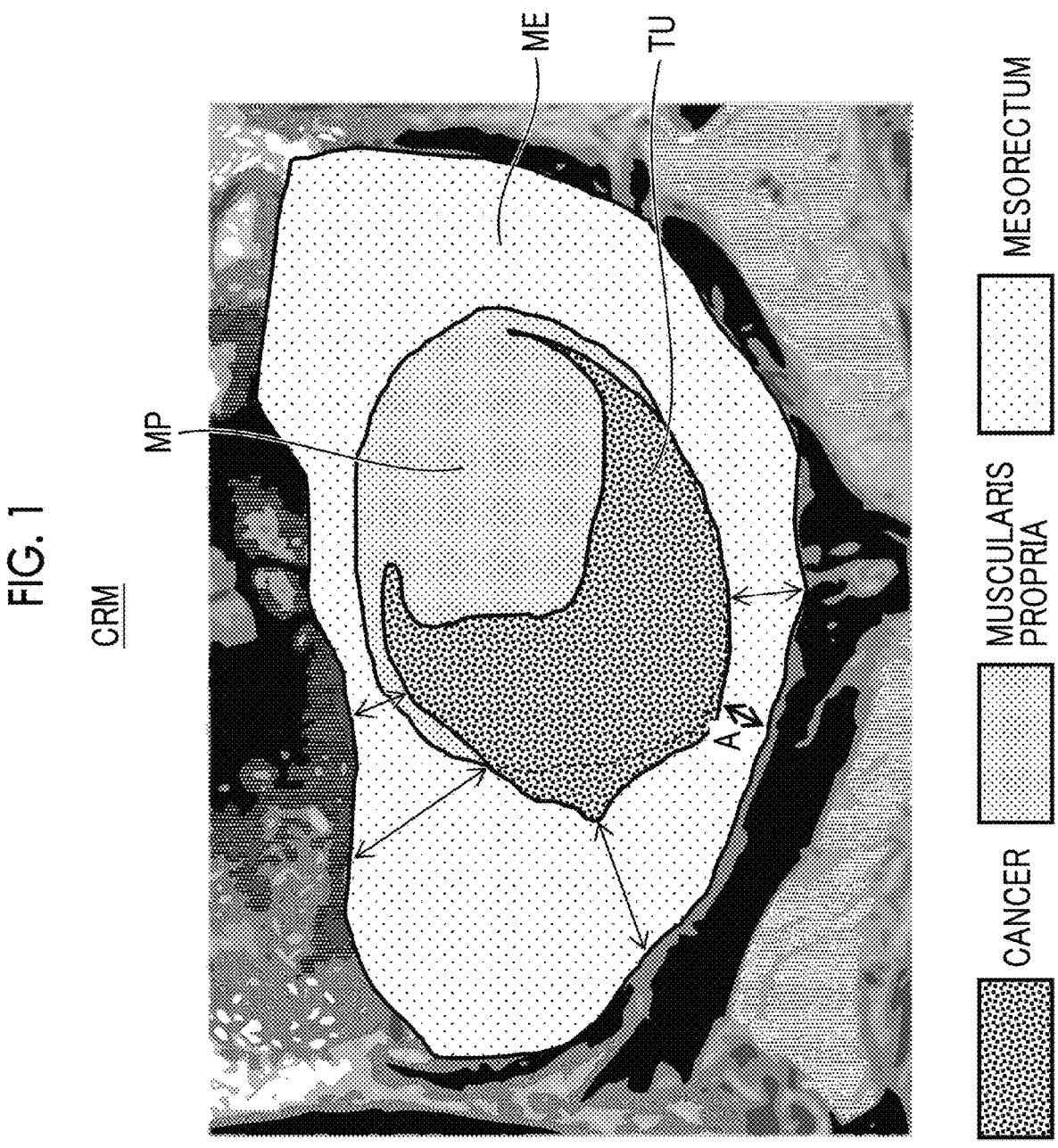
FIG. 1 is a diagram illustrating an example in which CRM is measured from an MRI image obtained by imaging a patient with a rectal cancer.
Figure 2:
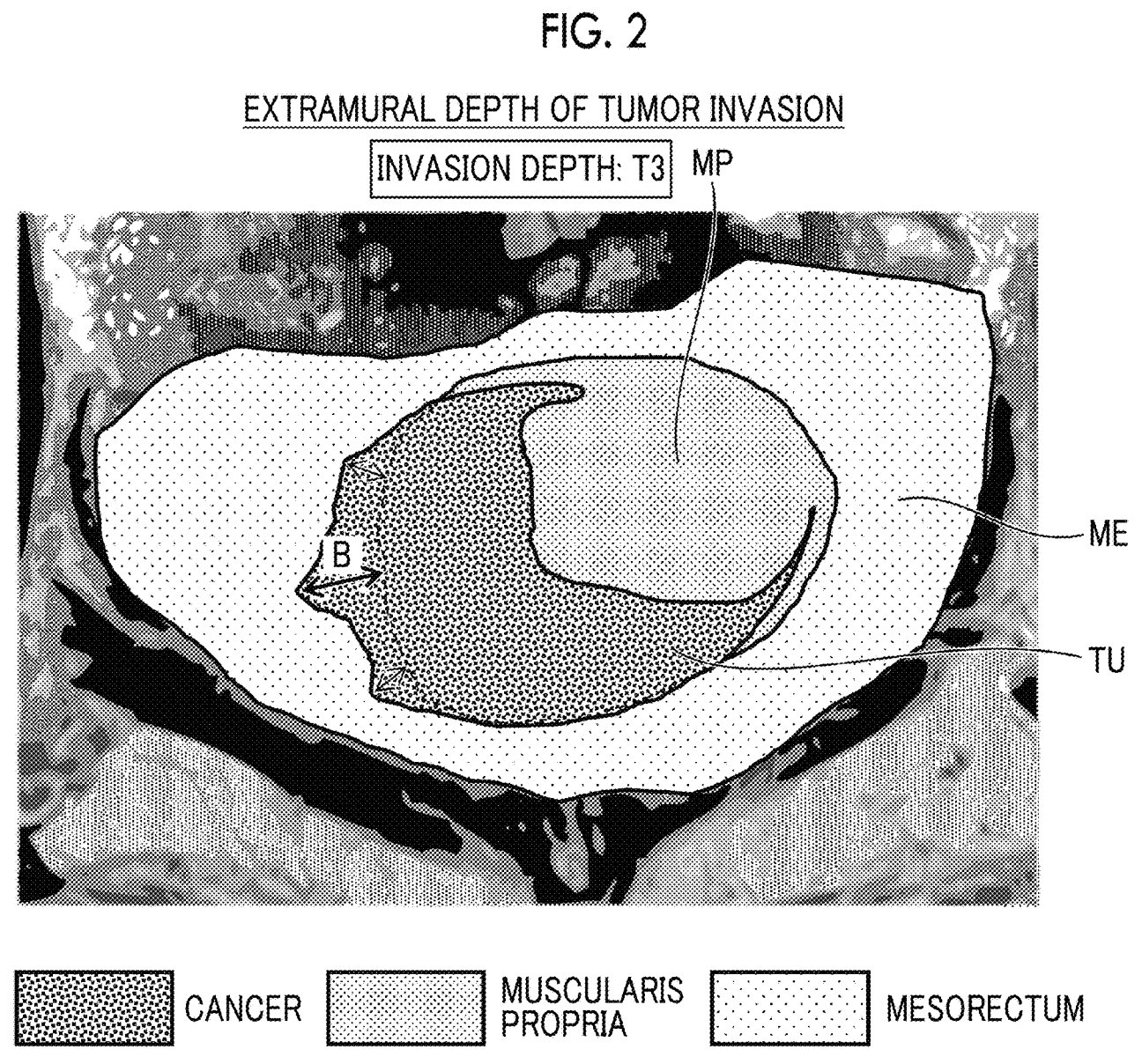

FIG. 1 and FIG. 2 are examples of an MRI image obtained by imaging a patient with a rectal cancer. In FIG. 1 and FIG. 2, in order to make it easier to see each region of a cancer TU, a muscularis propria MP, and a mesorectum ME, each region is displayed with a different filling pattern. Although a two-dimensional image is illustrated in FIG. 1 and FIG. 2, the MRI image actually acquired is a three-dimensional image.

In a modality such as an MRI apparatus or a CT apparatus, three-dimensional data representing a three-dimensional shape of an object is obtained by continuously imaging two-dimensional slice images. In this specification, the term "three-dimensional image" includes a concept of a two-dimensional slice image set (two-dimensional image sequence) obtained by continuously imaging an object. The term "image" includes meaning of image data.

FIG. 1 illustrates an example in which CRM is measured. A bidirectional arrow A illustrated in FIG. 1 represents a closest portion (closest part) at which a distance from the cancer TU to the mesorectum ME is shortest. In a case of determining a degree of progress of a cancer, a length mm of the distance of the closest part (closest distance) is one of important parameters. In a case where the closest distance is equal to or shorter than 1 mm, a CRM positive result is obtained.

FIG. 2 illustrates an example in which the extramural depth of tumor invasion is measured. A bidirectional arrow B illustrated in FIG. 2 represents a portion at which a distance that the cancer TU invades beyond the muscularis propria MP is largest (longest). Classification is performed according to a length mm of the cancer TU invading beyond the muscularis propria MP.

Figure 3:
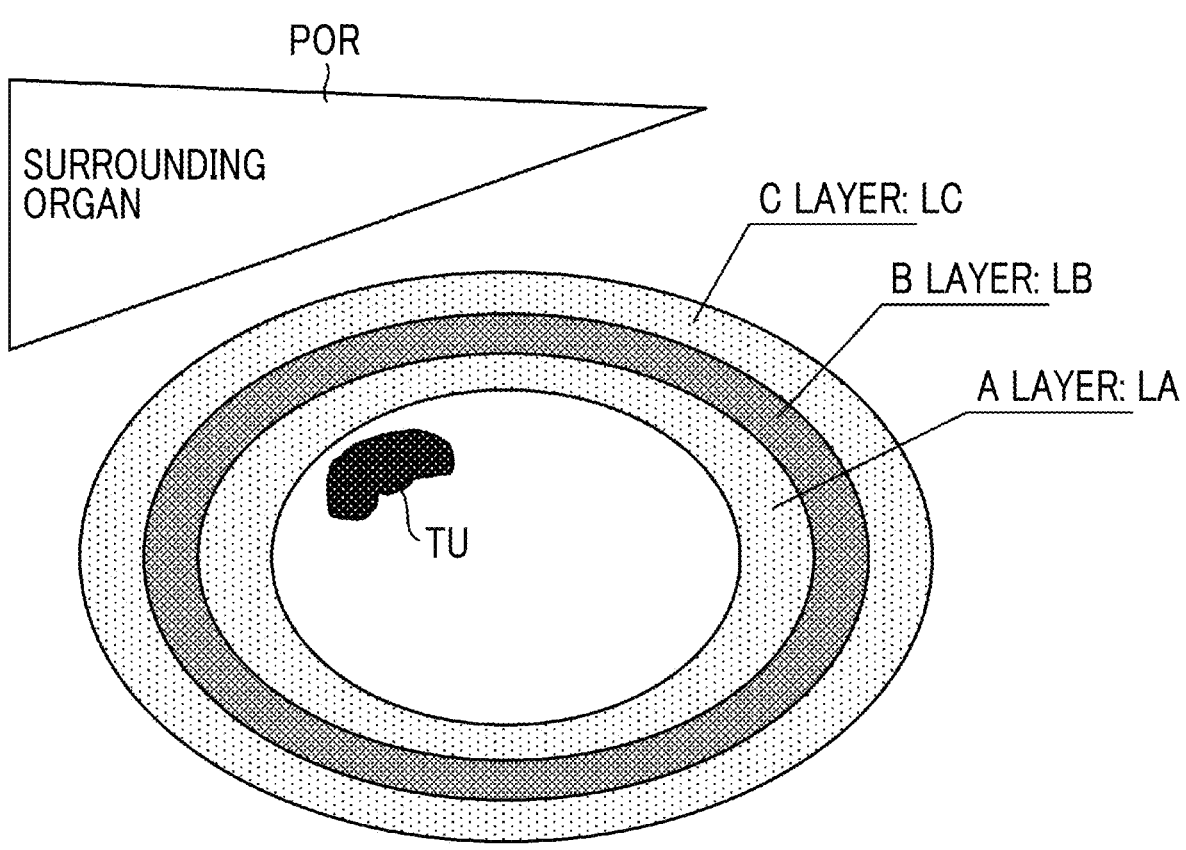
FIG. 3 is an image diagram schematically illustrating a relationship between a cancer and a tissue layer serving as a reference for determination of an invasion depth.

FIG. 3 is an image diagram schematically illustrating a relationship between a cancer and a tissue layer serving as a reference for determination of an invasion depth. In FIG. 3, for the sake of simplification of illustration, three layers of an A layer LA, a B layer LB, and a C layer LC and a surrounding organ POR outside the three layers are illustrated outward from a lumen of an intestinal tract. In rectal cancer, the cancer TU develops from epithelial cells in the lumen of the intestinal tract IT, and invades an outer tissue as the cancer TU progresses.

Figure 4:
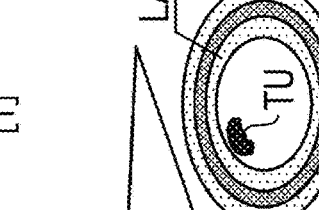
FIG. 4 is an image diagram schematically illustrating a state where a cancer progresses.
Figure 4:
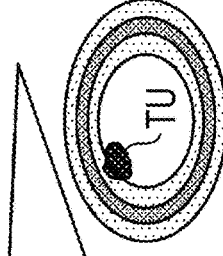
Figure 4:
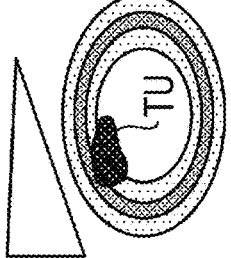
Figure 4:
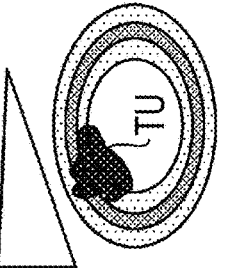
Figure 4:
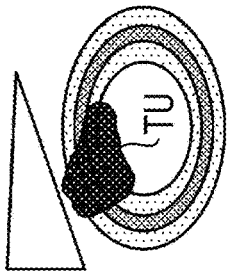

FIG. 4 is an image diagram schematically illustrating how the cancer TU progresses. In order to allow a doctor to determine a degree of progress of the cancer or determine a resection surface, it is necessary to three-dimensionally measure a distance between the cancer TU and a tissue surrounding the cancer TU. Hereinafter, for convenience of explanation, a positional relationship in which a tissue A, a tissue B, and a tissue C are arranged in this order outward from a lumen of an intestinal tract is expressed as "A<B<C". In addition, a positional relationship in a case where a deepest portion of the cancer TU is located between the tissue A and the tissue B is expressed as "A<cancer<B".

[Case 1] For example, in a case where the positional relationship between the cancer TU and the surrounding tissue is "A<cancer<B", it is necessary to three-dimensionally measure a closest distance between the tissue B outside the cancer TU and a portion of the region of the cancer TU that invades beyond the tissue A. Further, in addition to the measurement of the closest distance, it is desirable to three-dimensionally measure a farthest distance of the cancer TU from the tissue A in a case where the cancer TU invades beyond the tissue A. In this case 1, for example, the tissue A may be the muscularis propria MP illustrated in FIG. 1, and the tissue B may be the mesorectum ME. The closest distance may be referred to as a shortest distance or a minimum distance, and the farthest distance may be referred to as a longest distance or a maximum distance. The closest distance may indicate a residual distance to a next tissue in which the cancer TU does not yet invade, that is, a margin distance to a closest tissue in which the cancer TU does not invade. On the other hand, the farthest distance may indicate a maximum distance with which the cancer TU invades beyond a reference surface, that is, how deeply the cancer TU invades from the reference surface.

[Case 2] In a case where the positional relationship between the cancer TU and the surrounding tissue is "A<B<cancer<C", it is necessary to three-dimensionally measure a closest distance between the tissue C outside the cancer TU and a portion of the cancer TU that invades beyond the tissue B. Further, in addition to the measurement of the closest distance, it is desirable to three-dimensionally measure a farthest distance of the cancer TU from the tissue B in a case where the cancer TU invades beyond the tissue B. In this case 2, for example, the tissue B may be the mesorectum ME illustrated in FIG. 1, and the tissue C may be the surrounding organ POR.

<<Outline of Medical Image Processing Apparatus>>

FIG. 5 is a functional block diagram illustrating functions of the medical image processing apparatus 20 according to the embodiment of the present disclosure. The medical image processing apparatus 20 is realized by using hardware and software of a computer. The software is synonymous with a program. The medical image processing apparatus 20 includes an image acquisition unit 222, a lesion region extraction unit 224, a lesion region input reception unit 226, a measurement reference surface extraction unit 228, a measurement reference surface input reception unit 230, and a distance measurement unit 232, and a display image generation unit 234. In addition, the medical image processing apparatus 20 is connected to an input device 214 and a display device 216.

The image acquisition unit 222 acquires a medical image to be processed from an image storage server or the like (not illustrated). Here, an MR image obtained by performing imaging by using an MRI apparatus is used as a medical image to be processed. On the other hand, the present invention is not limited thereto, and an image obtained by performing imaging by another modality such as a CT apparatus may be used.

In the present embodiment, image diagnosis of a cancer developing in a digestive organ is assumed. Thus, the medical image acquired via the image acquisition unit 222 is, for example, a three-dimensional image obtained by imaging a region including the cancer and the surrounding tissue as one image. In addition, the medical image processing apparatus 20 three-dimensionally measures a distance in units of millimeters. Thus, preferably, an image to be processed is high-resolution three-dimensional data of isotropic voxels.

The lesion region extraction unit 224 performs lesion region extraction processing of automatically extracting a lesion region in the image from the medical image acquired via the image acquisition unit 222 by image recognition. In the present embodiment, the lesion region is a cancer region. The lesion region extraction unit 224 extracts a lesion region by performing image segmentation on the input medical image by using, for example, a trained model, which is obtained by training image segmentation tasks by machine learning represented by deep learning.

As a learning model of performing image segmentation, for example, a convolution neural network (CNN) is used.

The lesion region extraction unit 224 is not limited to the configuration in which segmentation for classifying a lesion region and the other regions is performed, and may be configured to perform segmentation for classifying a lesion region and each region of a plurality of surrounding tissues. For example, the lesion region extraction unit 224 may perform extraction of a lesion region and extraction of surrounding regions by using a trained model, which is trained to receive an input of a three-dimensional image, classify each region of a cancer region as a lesion region, a mucous membrane, a submucous membrane, a muscularis propria, a subserous membrane, and other surrounding organs, and output an image corresponding to a segmentation result obtained by assigning a mask pattern to each region.

The lesion region input reception unit 226 receives an input of information on the lesion region which is automatically extracted by the lesion region extraction unit 224. In addition, the lesion region input reception unit 226 receives an input of information on a lesion region designated by a user by using the input device 214. A doctor who is a user can freely designate a region different from the lesion region, which is automatically extracted by the lesion region extraction unit 224, by using the input device 214. For example, the doctor can designate, by using the input device 214, a region recognized as a cancer or a region suspected as a cancer among regions which are not extracted as the cancer TU by the automatic extraction.

The measurement reference surface extraction unit 228 performs processing of adaptively extracting, from the medical image, a measurement reference surface serving as a reference for lesion evaluation according to an extent of spread of the lesion region based on the information on the lesion region obtained via the lesion region input reception unit 226. A digestive tract has a multi-layered structure including a plurality of layers from the lumen toward the outside, and other organs are present on the outer side of a serous membrane. The measurement reference surface extraction unit 228 automatically selects a tissue to be used as a reference for evaluation of a degree of progress of the cancer from the positional relationship between the cancer TU which is a lesion region and a layer or another organ around the cancer TU, and automatically extracts a measurement reference surface which is a reference for distance measurement. The degree of spread of the cancer changes depending on the degree of progress of the cancer, and thus an appropriate measurement reference surface is automatically extracted according to the degree of progress. The measurement reference surface may be a curved surface.

The measurement reference surface extraction unit 228 selects an innermost non-invasion tissue and an outermost invasion tissue based on the positional relationship between the cancer TU and the surrounding tissue, and determines a measurement reference surface based on these tissues, the innermost non-invasion tissue being a tissue having an innermost region (region on a side closer to epithelial cells) which is a region outside a deepest portion of the cancer TU, and the outermost invasion tissue being a tissue having an outermost region which is a region inside a deepest portion of the cancer TU among tissues invaded by the cancer TU. In FIG. 1, the mesorectum ME corresponds to the innermost non-invasion tissue, and the muscularis propria MP corresponds to the outermost invasion tissue.

For example, an outer circumference surface of the innermost non-invasion tissue can be a measurement reference surface for measuring the closest distance. In addition, a boundary surface between the innermost non-invasion tissue and the outermost invasion tissue, an outer circumference surface of the outermost invasion tissue, or the like can be a measurement reference surface for measuring the farthest distance.

The measurement reference surface extraction unit 228 automatically extracts at least one reference surface from a first measurement reference surface for measuring the closest distance or a second measurement reference surface for measuring the farthest distance, based on the positional relationship between the cancer TU and the surrounding tissue in a region near the deepest portion of the cancer TU in the medical image. From a viewpoint of clinical importance, preferably, the measurement reference surface extraction unit 228 automatically extracts at least the first measurement reference surface, and more preferably, the measurement reference surface extraction unit 228 extracts both the first measurement reference surface and the second measurement reference surface.

The measurement reference surface input reception unit 230 receives an input of information on the measurement reference surface which is automatically extracted by the measurement reference surface extraction unit 228. In addition, the measurement reference surface input reception unit 230 receives an input of information on the measurement reference surface which is designated by the user by using the input device 214. A doctor who is a user can freely designate, via the input device 214, a reference surface different from the measurement reference surface which is automatically extracted by the measurement reference surface extraction unit 228. The measurement reference surface to be used for measurement is determined by the information which is input via the measurement reference surface input reception unit 230.

For example, in a case where a doctor examines a resection surface before a surgery, the doctor can designate not only an anatomically-existing boundary surface or the like but also a virtual surface in a layer (a virtual surface that does not actually exist) or the like as a surface to be resected. In a case where distance measurement is performed by using, as the measurement reference surface, the surface to be resected, it is possible to recognize a resection margin and the like.

The distance measurement unit 232 performs three-dimensional distance measurement from the measurement reference surface to the cancer TU based on the input medical image. The distance measurement unit 232 measures at least one distance of the closest distance or the farthest distance. The distance measurement unit 232 preferably measures at least the closest distance, and more preferably measures both the closest distance and the farthest distance. The distance measurement unit 232 measures the closest distance between the first measurement reference surface and the cancer by using, as a reference, the first measurement reference surface. In addition, the distance measurement unit 232 measures the farthest distance between the second measurement reference surface and the cancer by using, as a reference, the second measurement reference surface. Further, the distance measurement unit 232 measures at least one distance of the closest distance or the farthest distance by using, as a reference, the measurement reference surface designated by the user.

In a case where an input of designation of a lesion region is received from the user, a mode for measuring a distance from the designated region can also be used. Further, a mode for measuring the closest distance and/or the farthest distance by grouping the whole lesion regions including the lesion region which is automatically extracted and the lesion region which is designated by the user and regarding the whole lesion regions as one lesion region can also be used. Preferably, these measurement modes are selectable. In a case of determining a degree of progress of the lesion, it is preferable to perform distance measurement on the whole aggregated regions including the lesion region which is automatically extracted and the lesion region which is added by manual input of a user's operation and evaluate the closest distance and/or the farthest distance.

As a method of measuring the distance, for example, for each of a plurality of points on a contour of an invasion portion of a lesion to be measured, a distance to a closest point on the first measurement reference surface is calculated, and a minimum distance between the two points is acquired as the closest distance. In addition, for example, for each of a plurality of points on a contour of an invasion portion of a lesion to be measured, a distance to a closest point on the second measurement reference surface is calculated, and a maximum distance between the two points is acquired as the farthest distance.

The display image generation unit 234 generates a display image to be displayed on the display device 216. The display image generation unit 234 generates a display cross-section image (two-dimensional image) from the three-dimensional image. The display image generation unit 234 generates at least one cross-section image of an axial cross-section image, a coronal cross-section image, or a sagittal cross-section image, and preferably generates all three types of cross-section images. In addition, the display image generation unit 234 generates data required for display such that information indicating the measurement distance and the measurement portion in the measurement result obtained by the distance measurement unit 232 is displayed together with the cross-section image.

In a case where the distance measurement unit 232 measures the closest distance, text information including a numerical value indicating the closest distance and a mark such as an arrow indicating the closest portion at which the closest distance is measured are displayed together with the cross-section image on a screen of the display device 216.

In a case where the distance measurement unit 232 measures the farthest distance, text information including a numerical value indicating the farthest distance and a mark indicating the farthest portion at which the farthest distance is measured are displayed together with the cross-section image on the screen of the display device 216. Items to be displayed can be selected from the input device 214, and display content of the display screen can be switched by appropriately changing the display items.

Figure 6:
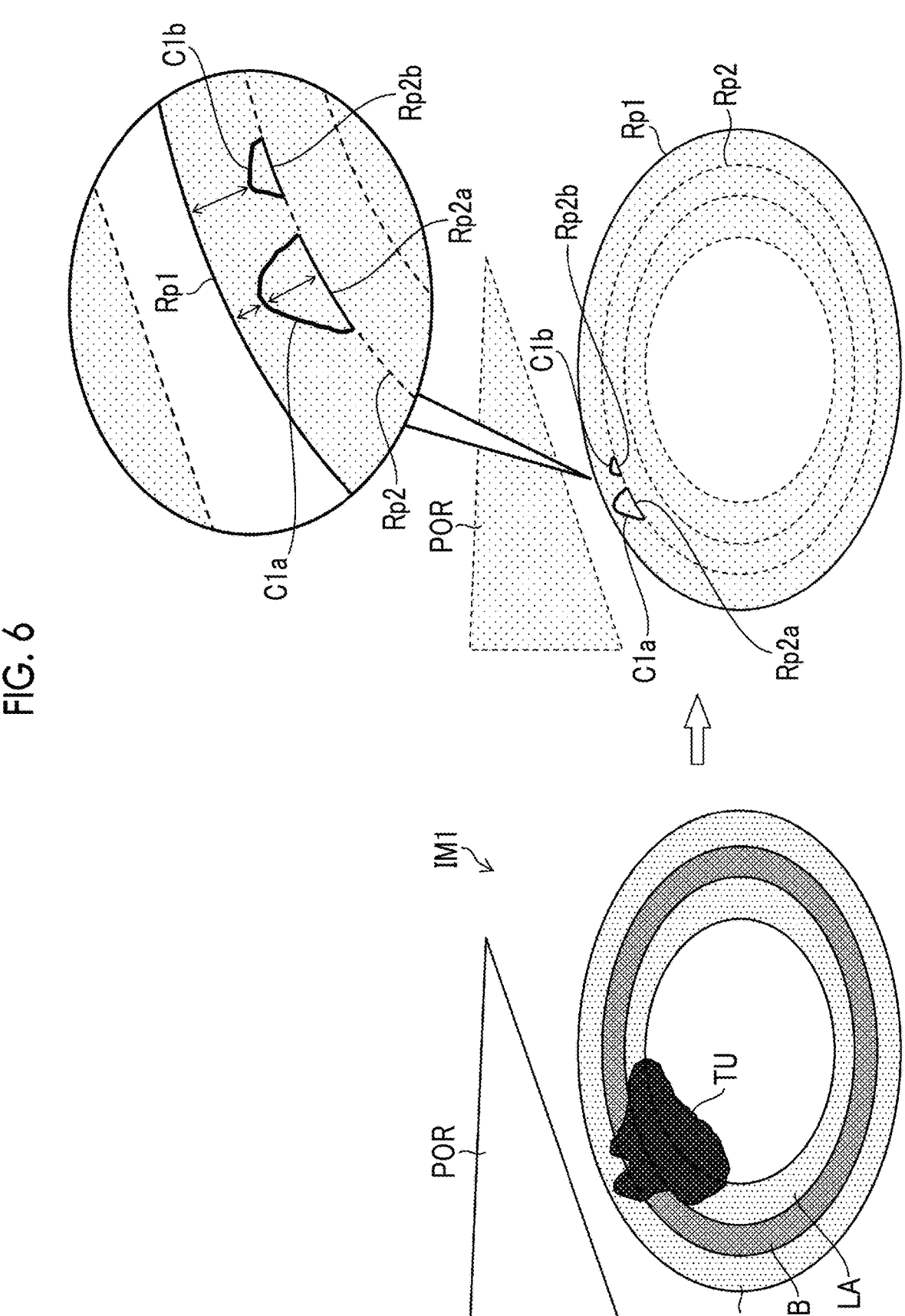
FIG. 6 is an image diagram schematically illustrating an example of selection of a measurement reference surface and distance measurement.

FIG. 6 is an image diagram schematically illustrating an example of selection of the measurement reference surface and distance measurement. FIG. 6 illustrates a case of a degree of progress of a stage [4] in FIG. 4. The cancer TU illustrated in FIG. 6 invades the C layer LC beyond the B layer LB, and has a positional relationship of the B layer LB<the cancer TU<the C layer LC. In this case, each of the C layer LC and the B layer LB can serve as a reference tissue for evaluation of a degree of progress of the cancer TU.

An outermost circumference surface of the C layer LC may be set as the first measurement reference surface Rp1, and an outermost circumference surface of the B layer LB may be set as the second measurement reference surface Rp2. The outermost circumference surface of the B layer LB may be understood as a boundary surface between the C layer LC and the B layer LB. The first measurement reference surface Rp1 is set to be outside the cancer TU. The second measurement reference surface Rp2 is set at a position intersecting with the region of the cancer TU.

As illustrated in a right part of FIG. 6, the medical image processing apparatus 20 specifies, from an image IM1 illustrated on a left side of FIG. 6, a first measurement reference surface Rp1 and contour surfaces C1a and C1b indicating outer circumference surfaces of the cancer TU in a region near the deepest portion of the cancer TU, and three-dimensionally measures a distance between a point on the first measurement reference surface Rp1 and a point on the contour surfaces C1a and C1b. In addition, the medical image processing apparatus 20 obtains a distance which is closest (closest distance) among the measured distances between the points.

Further, the medical image processing apparatus 20 specifies, from the image IM1, measurement reference surfaces Rp2a and Rp2b which are a portion of the second measurement reference surface Rp2, and three-dimensionally measures a distance between a point on the measurement reference surfaces Rp2a and Rp2b and a point on the contour surfaces C1a and C1b. In addition, the medical image processing apparatus 20 obtains a distance which is farthest (farthest distance) among the measured distances between the points. The measurement reference surfaces Rp2a and Rp2b are portions of the second measurement reference surface Rp2 which are invaded by the cancer TU.

In FIG. 6, the C layer LC is an example of the "innermost non-invasion tissue" in the present disclosure. Further, the B layer LB is an example of the "outermost invasion tissue" in the present disclosure. The contour surfaces C1a and C1b of the cancer TU are regions serving as a measurement reference for evaluation of a degree of progress of the cancer TU, and are an example of a "lesion-region-side measurement reference region" in the present disclosure.

In FIG. 6, an example of the positional relationship of the B layer LB<the cancer TU<the C layer LC has been described. On the other hand, a region to be measured is the cancer TU and the surrounding region, and the surrounding region to be measured changes depending on a degree of invasion of the cancer TU. The term "region" herein includes concepts of "tissue" and "structure". In a case of a colorectal cancer, a mucous membrane, a submucous membrane, a muscularis propria, a subserous membrane, a serous membrane, or other surrounding organs such as pancreas or liver can be a reference tissue for evaluation. A plurality of measurement reference surface candidates that can serve as measurement reference surfaces are set corresponding to each of these tissues. The measurement reference surface extraction unit 228 determines a measurement reference surface to be used for measurement among the plurality of measurement reference surface candidates according to the region of the cancer TU.

Figure 7:
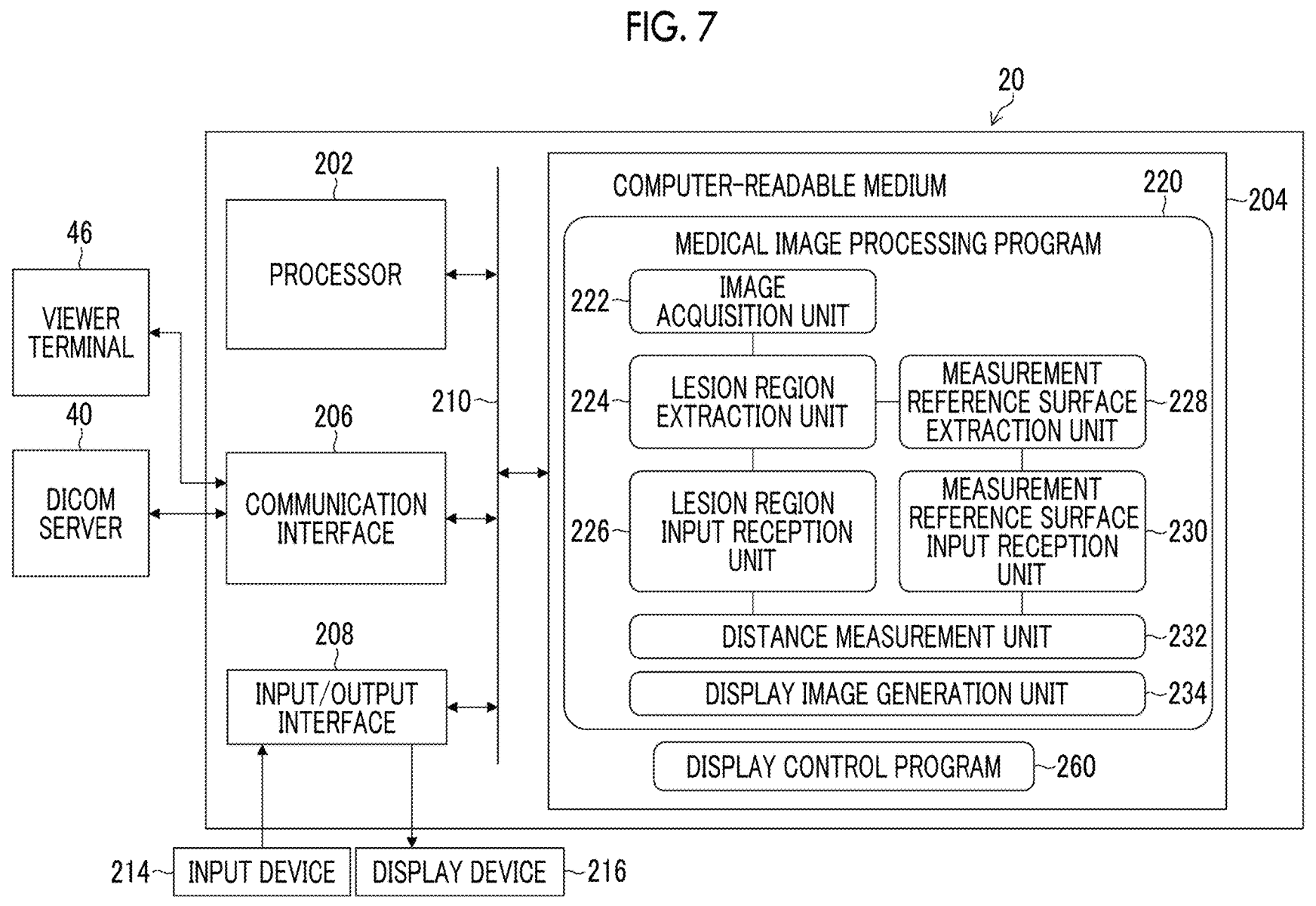

FIG. 7 is a block diagram illustrating a configuration example of the medical image processing apparatus 20. The medical image processing apparatus 20 includes a processor 202, a non-transitory tangible computer-readable medium 204, a communication interface 206, and an input/output interface 208. The processor 202 is an example of a "processor" according to the present disclosure. The computer-readable medium 204 is an example of a "storage device" in the present disclosure. A form of the medical image processing apparatus may be a server, a personal computer, a workstation, a tablet terminal, or the like.

The processor 202 includes a central processing unit (CPU). The processor 202 may include a graphics processing unit (GPU). The processor 202 is connected to the computer-readable medium 204, the communication interface 206, and the input/output interface 208 via the bus 210. The input device 214 and the display device 216 are connected to the bus 210 via the input/output interface 208.

The input device 214 is configured with, for example, a keyboard, a mouse, a multi touch panel, another pointing device, a voice input device, or an appropriate combination thereof. The display device 216 is configured with, for example, a liquid crystal display, an organic electro-luminescence (OEL) display, a projector, or an appropriate combination thereof.

The computer-readable medium 204 includes a memory as a main storage device and a storage as an auxiliary storage device. The computer-readable medium 204 may be, for example, a semiconductor memory, a hard disk drive (HDD) device, a solid state drive (SSD) device, or a combination of the devices.

The medical image processing apparatus 20 is connected to a communication line (not illustrated) via the communication interface 206, and is communicatively connected to apparatuses such as a digital imaging and communication in medicine (DICOM) server 40 and a viewer terminal 46 on a network in a medical institution.

A plurality of programs including a medical image processing program 220 and a display control program 260, data, and the like are stored in the computer-readable medium 204. In a case where the processor 202 executes a command of the medical image processing program 220, the processor 202 functions as the image acquisition unit 222, the lesion region extraction unit 224, the lesion region input reception unit 226, the measurement reference surface input reception unit 230, the distance measurement unit 232, and the display image generation unit 234.

The display control program 260 generates a display signal required for display output to the display device 216, and performs a display control of the display device 216.

<<Example of Medical Image Processing Method>>

Figure 8:
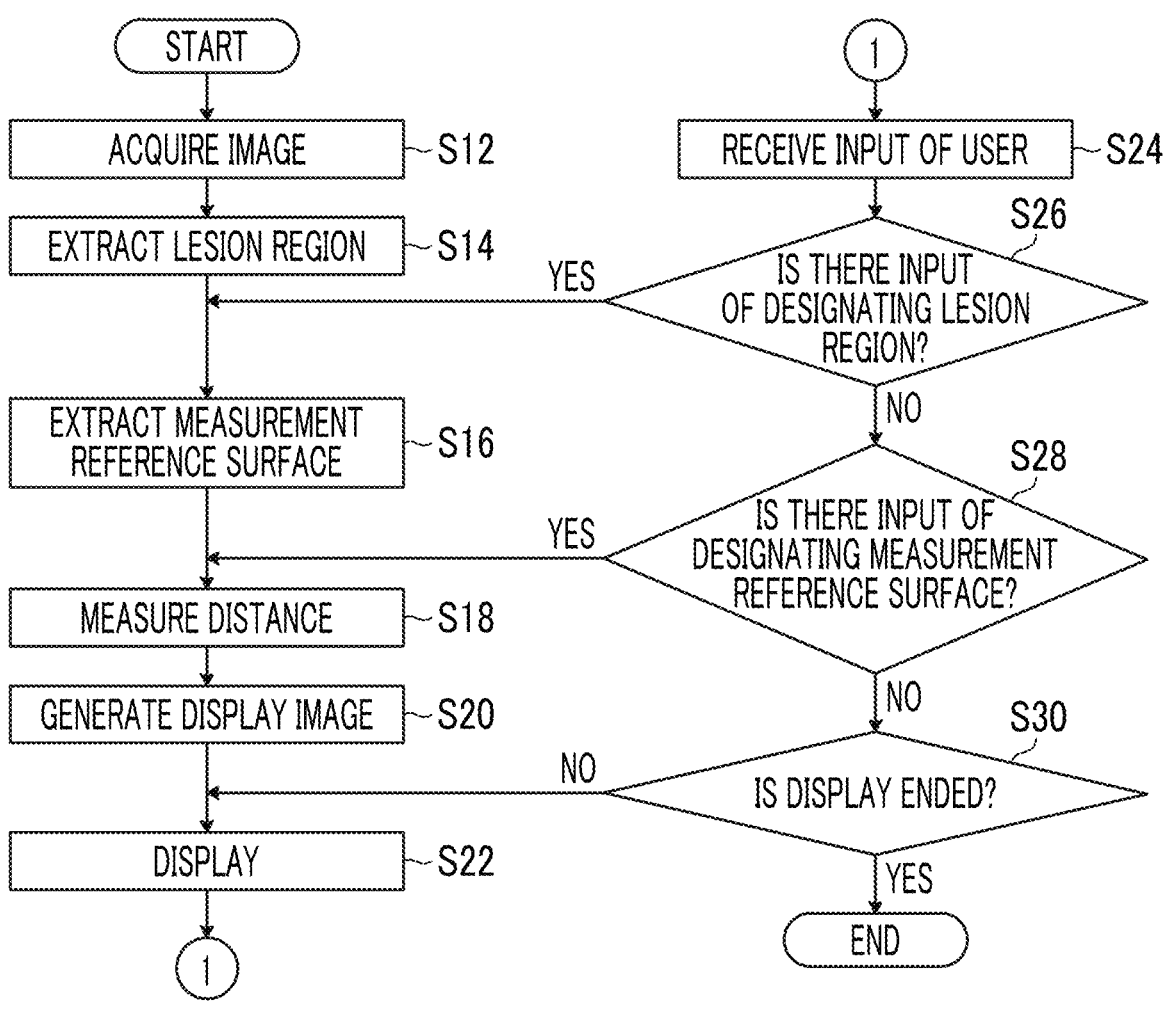
FIG. 8 is a flowchart illustrating an operation example of the medical image processing apparatus according to the embodiment.

FIG. 8 is a flowchart illustrating an example of an operation of the medical image processing apparatus 20. In step S12, the processor 202 acquires a medical image to be processed from the DICOM server 40 or the like.

Next, in step S14, the processor 202 automatically extracts a lesion region from the input medical image. The processor 202 extracts a lesion region by performing segmentation on the medical image by using a trained model.

In step S16, the processor 202 automatically extracts a measurement reference surface based on the specified lesion region.

In step S18, the processor 202 measures a distance between the specified measurement reference surface and the lesion region. For example, the processor 202 measures a closest distance between the measurement reference surface and the lesion region. Preferably, the processor 202 measures both a closest distance and a farthest distance.

In step S20, the processor 202 generates a display image for displaying distance information indicating a measurement result and a mark such as an arrow indicating a measurement portion on the display device 216 together with the medical image. The distance information presented on the display image is preferably, for example, text information including a numeral indicating a measured numerical value in millimeters.

In step S22, the processor 202 causes the display device 216 to display the generated display image. Thereby, annotations such as distance information are superimposed and displayed on the medical image.

Thereafter, in step S24, the processor 202 receives inputs of various instructions from the user. The user can perform various inputs such as designation of a lesion region and designation of a measurement reference surface via the input device 214.

In step S26, the processor 202 determines whether or not there is an input of designating a lesion region from the input device 214. In a case where the user performs an operation of designating a portion suspected to be a lesion in the medical image and inputs information for designating a lesion region (in a case where a determination result in step S26 is YES), the processor 202 proceeds to step S16, and extracts a measurement reference surface based on the designated lesion region.

On the other hand, in a case where the determination result in step S26 is NO, that is, in a case where there is no input for designating a lesion region, the processor 202 proceeds to step S28.

In step S28, the processor 202 determines whether or not there is an input for designating a measurement reference surface from the input device 214. In a case where the user performs an operation of designating a measurement reference surface and inputs information for designating a measurement reference surface (in a case where a determination result in step S28 is YES), the processor 202 proceeds to step S18, and measures a distance based on the designated measurement reference surface.

On the other hand, in a case where the determination result in step S28 is NO, that is, in a case where information for designating a measurement reference surface is not input, the processor 202 proceeds to step S30.

In step S28, the processor 202 determines whether or not to end the display of the medical image. A display end condition may be an input of an end instruction by the user or an end command based on a program. In a case where the end condition is not satisfied and the determination result in step S28 is NO, the processor 202 proceeds to step S22 and continues the display.

On the other hand, in a case where the determination result in step S30 is YES, that is, in a case where the end condition is satisfied, such as a case where an operation of closing a display window is performed by a user, the processor 202 ends the display and ends the flowchart of FIG. 8.

The processing function of the medical image processing apparatus 20 can also be realized in a case where the processing is shared by a plurality of computers.

<<Specific Example of User Interface>>

Figure 9:
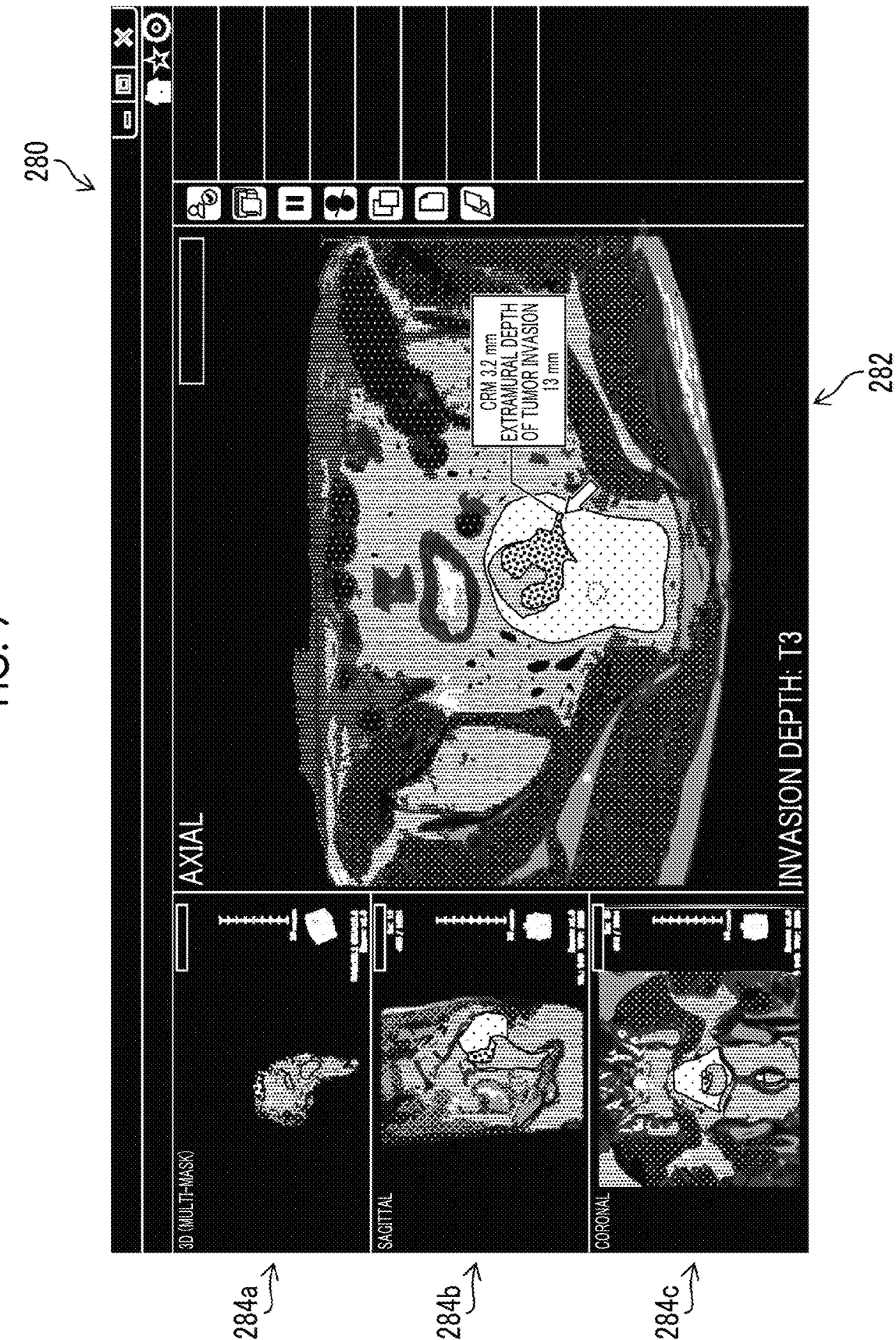
FIG. 9 is an example of a display screen displayed using the medical image processing apparatus according to the embodiment.

FIG. 9 is an example of a display screen displayed using the medical image processing apparatus 20. FIG. 9 illustrates an example of a display screen in a case where a portion of one entire three-dimensional image is displayed, the portion being a portion of which the extramural depth of tumor invasion is longest. A display window 280 illustrated in FIG. 9 includes a central main display area 282 and a plurality of sub-display areas 284a, 284b, and 284c which are vertically arranged on a left side of the main display area 282. In the example of FIG. 9, an axial cross-section image is displayed in the main display area 282. On the cross-section image, distance information indicating measurement results of the CRM and the extramural depth of tumor invasion and an arrow indicating a farthest portion (a portion having a longest distance) at which the extramural depth of tumor invasion is measured are superimposed and displayed. A background of the text may be a watermark (without filling). The text color, the presence or absence of the background, and the like may be appropriately set from a viewpoint of visibility.

Similarly, the portion at which the CRM is shortest can also be displayed with an annotation using an arrow and distance information.

A 3D multi-mask image is displayed in the sub-display area 284a. In addition, a sagittal cross-section image is displayed in the sub-display area 284b, and a coronal cross-section image is displayed in the sub-display area 284c. The type of the image to be displayed in each display area can be appropriately selected.

Figure 10:
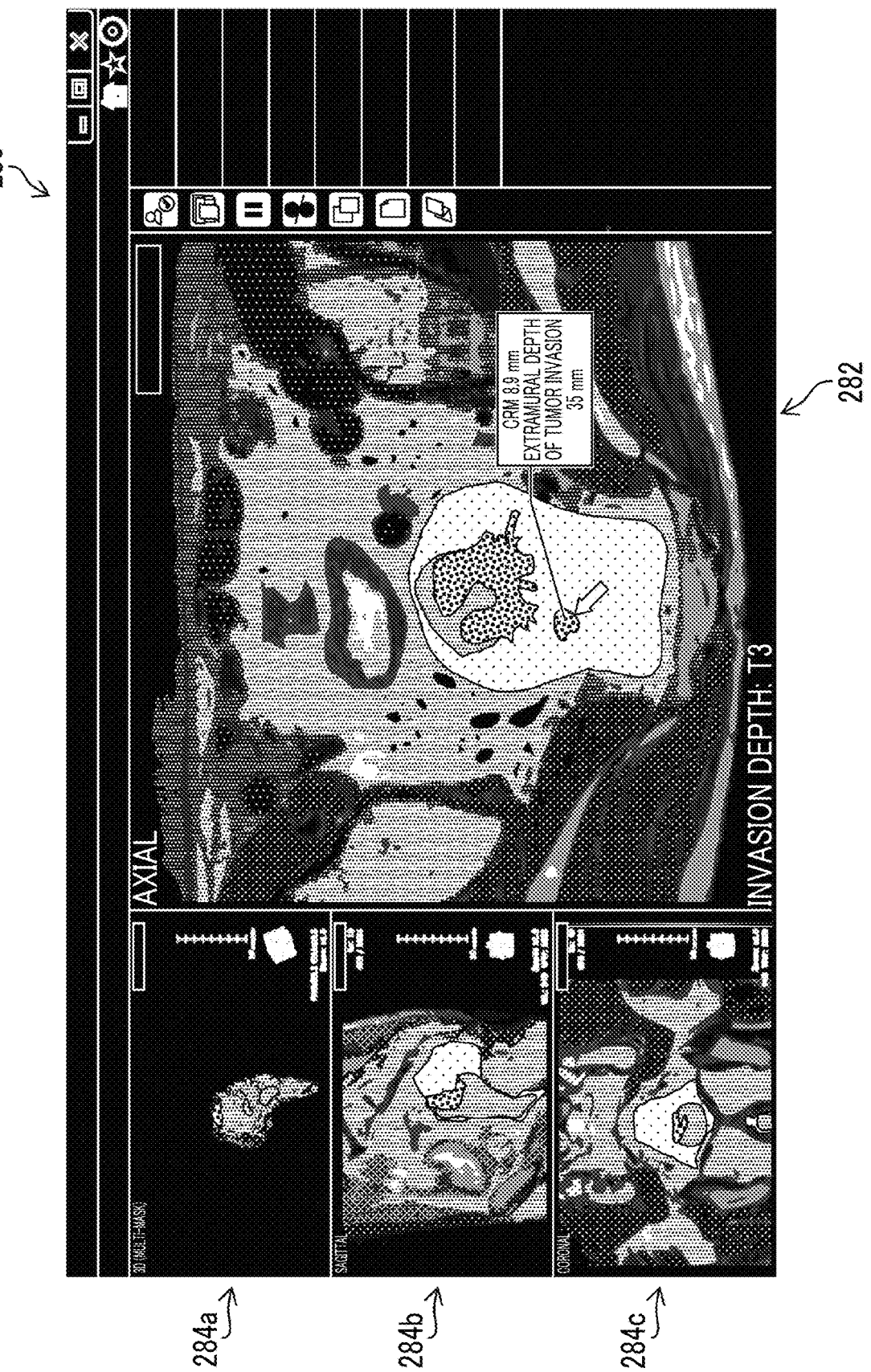
FIG. 10 is another example of a display screen displayed using the medical image processing apparatus according to the embodiment.

FIG. 10 is another example of a display screen displayed using the medical image processing apparatus 20. FIG. 10 illustrates an example of a display screen displayed in a case where a distance is measured at a portion that is suspected to be a lesion and is input by the user using a cursor.

Figure 11:
FIG. 11 is an example of a display screen in a case of displaying a cross-section illustrating a portion at which CRM is closest to a point selected by a user.

FIG. 11 is an example in a case of displaying a cross-section illustrating a portion at which the CRM is closest to a point selected by the user in FIG. 10. In a case of displaying the closest distance and/or the farthest distance, it is preferable to display a cross-section in which each distance is measured, that is, a plane including two points at which the distance is measured (refer to FIG. 11).

FIG. 11 illustrates an example of displaying a plane on which the measured distance can be understood from the measurement result related to the point which is input by the user. On the other hand, the same applies to a lesion region that is automatically extracted. A plane on which the measured distance can be understood from the measurement result related to a point at which the closest distance or the farthest distance in the entire image is obtained may be displayed.

Figure 12:
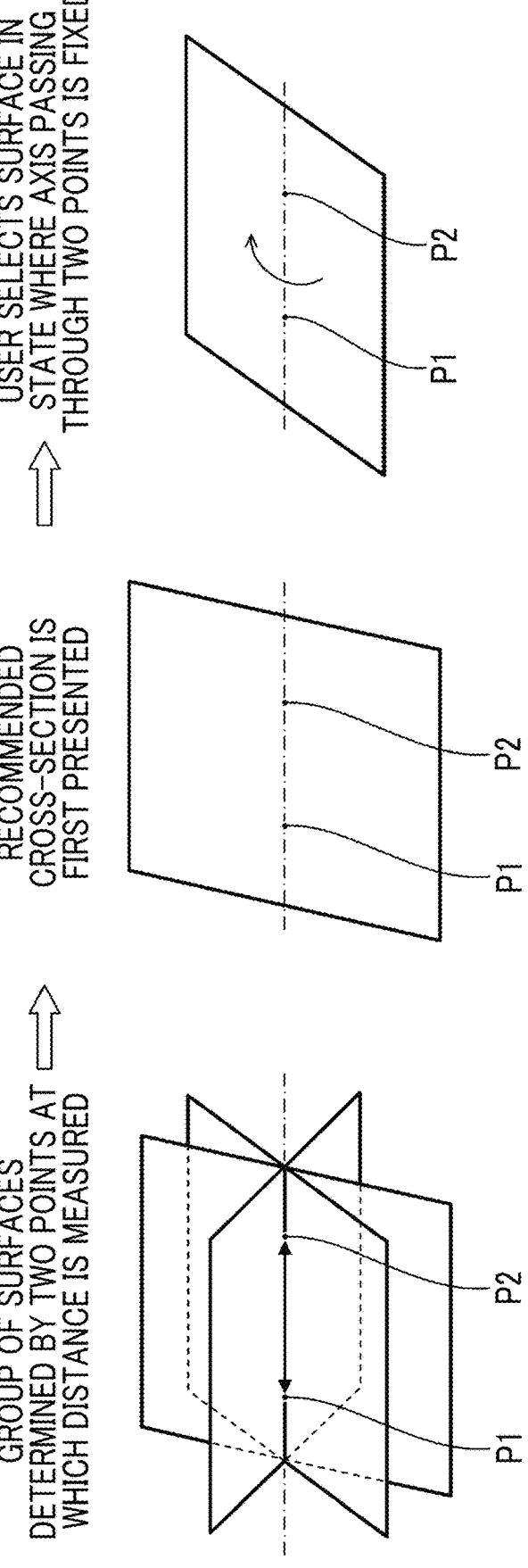
FIG. 12 is a conceptual diagram illustrating a method of displaying a cross-section in which a measured distance can be understood from a measurement result related to a point at which a closest distance or a farthest distance is measured or a point which is input by a user.

FIG. 12 is a conceptual diagram illustrating a method of displaying a cross-section in which the measured distance can be understood from the measurement result related to a point at which the closest distance or the farthest distance is measured or a point which is input by the user. For example, the processor 202 determines a cross-section in which the measured distance can be most easily understood as a "recommended cross-section" from a group of planes determined by the two points P1 and P2 at which the closest distance or the farthest distance is measured, and first presents a cross-section image of the recommended cross-section. As a method of determining the recommended cross-section, for example, it is considered to apply Rule 1 or Rule 2 as follows.

Rule 1: A plane which passes through the two measured points and of which an angle with a centerline of an intestinal tract is closest to an angle of 90 degrees is set as the recommended cross-section.

Rule 2: A plane which passes through the two measured points and on which a cross-section area of the intestinal tract is smallest is set as the recommended cross-section.

In addition, preferably, the processor 202 is configured to receive an operation from a user after the cross-section image of the recommended cross-section is presented such that the user can arbitrarily select a slice plane. In this case, an axis passing through the two points (a two-point passage axis) may be a fixed axis, and the user can arbitrarily select a plane from a group of planes having the fixed axis.

The intestinal tract is an example of a "hollow organ" in the present disclosure, and the centerline of the intestinal tract is an example of a "centerline of a hollow organ" in the present disclosure. The recommended cross-section is not limited to the plane described with reference to FIG. 12. In a plurality of specific cross-sections such as an axial cross-section, a coronal cross-section, and a sagittal cross-section, a specific cross-section closest to the plane according to Rule 1 or Rule 2 may be determined as the recommended cross-section.

<<Example of System Configuration>>

Figure 13:
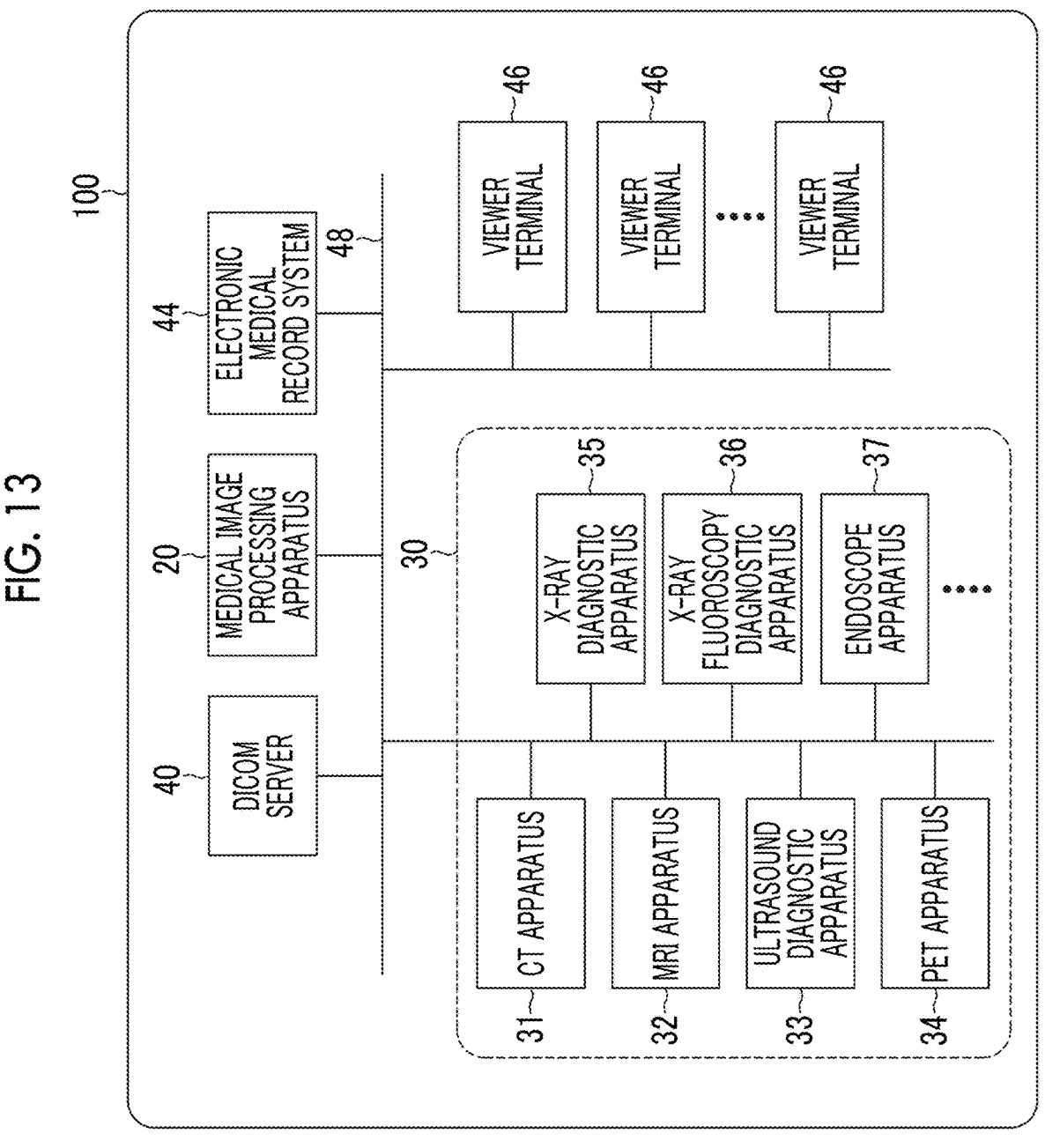
FIG. 13 is a block diagram illustrating a configuration example of a medical information system including the medical image processing apparatus according to the embodiment.

FIG. 13 is a block diagram illustrating a configuration example of a medical information system 100 including a medical image processing apparatus 20. The medical information system 100 is a computer network provided in a medical institution such as a hospital, and includes a modality 30 for obtaining a medical image by performing imaging, a DICOM server 40, a medical image processing apparatus 20, an electronic medical record system 44, and a viewer terminal 46. These components are connected to each other via a communication line 48. The communication line 48 may be a local communication line within a medical institution. Further, a portion of the communication line 48 may be a wide area communication line.

Specific examples of the modality 30 include a CT apparatus 31, an MRI apparatus 32, an ultrasound diagnosis apparatus 33, a positron emission tomography (PET) apparatus 34, an X-ray diagnosis apparatus 35, an X-ray fluoroscopy diagnosis apparatus 36, and an endoscope apparatus 37. The type of the modality 30 connected to the communication line 48 can be combined in various ways for each medical institution.

The DICOM server 40 is a server that operates according to a DICOM specification. The DICOM server 40 is a computer that stores and manages various types of data including images obtained by performing imaging by using the modality 30, and includes a large-capacity external storage device and a database management program. The DICOM server 40 transmits and receives various types of data including image data by performing communication with another apparatus via the communication line 48. The DICOM server 40 receives various types of data including image data and the like which are generated by the modality 30 via the communication line 48, and stores and manages the data in a recording medium such as a large-capacity external storage device. A storage format of the image data and communication between apparatuses via the communication line 48 are based on a DICOM protocol.

The medical image processing apparatus 20 can acquire the data from the DICOM server 40 or the like via the communication line 48. In addition, the medical image processing apparatus 20 can transmit a processing result to the DICOM server 40 and the viewer terminal 46. In the medical image processing apparatus 20, the processing function of the medical image processing apparatus 20 may be provided in the DICOM server 40 or the viewer terminal 46.

The various types of data stored in a database of the DICOM server 40 and various types of information including processing results generated by the medical image processing apparatus 20 can be displayed on the viewer terminal 46.

The viewer terminal 46 is an image viewer terminal called a PACS viewer or a DICOM viewer. A plurality of viewer terminals 46 may be connected to the communication line 48. A type of the viewer terminal 46 is not particularly limited, and may be a personal computer, a workstation, a tablet terminal, or the like. The designation of the lesion region, the designation of the measurement reference surface, and the like may be performed via an input device of the viewer terminal 46.

<<Program for Operating Computer>>

A program for realizing the processing function of the medical image processing apparatus 20 in a computer can be provided by being recorded in a computer-readable medium, which is a non-transitory tangible information storage medium such as an optical disk, a magnetic disk, a semiconductor memory, or the like, and being transmitted via the information storage medium.

Further, instead of the form in which the program is provided by being stored in a non-transitory tangible computer-readable medium, a program signal may be provided as a download service using a telecommunication line such as the Internet.

<<Hardware Configuration of Each Processing Unit>>

For a hardware structure of the processing unit that executes various processing, such as the image acquisition unit 222, the lesion region extraction unit 224, the lesion region input reception unit 226, the measurement reference surface extraction unit 228, the measurement reference surface input reception unit 230, the distance measurement unit 232, the display image generation unit 234, or the like of the medical image processing apparatus 20, for example, various processors as described below may be used.

The various processors include a CPU which is a general-purpose processor that functions as various processing units by executing a program, a GPU which is a processor specialized for image processing, a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by two or more processors having the same type or different types. For example, one processing unit may be configured by a plurality of FPGAs, a combination of a CPU and an FPGA, or a combination of a CPU and a GPU. Further, the plurality of processing units may be configured by one processor. As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

<<Example 1 of Measurement Target>>

Figure 14:
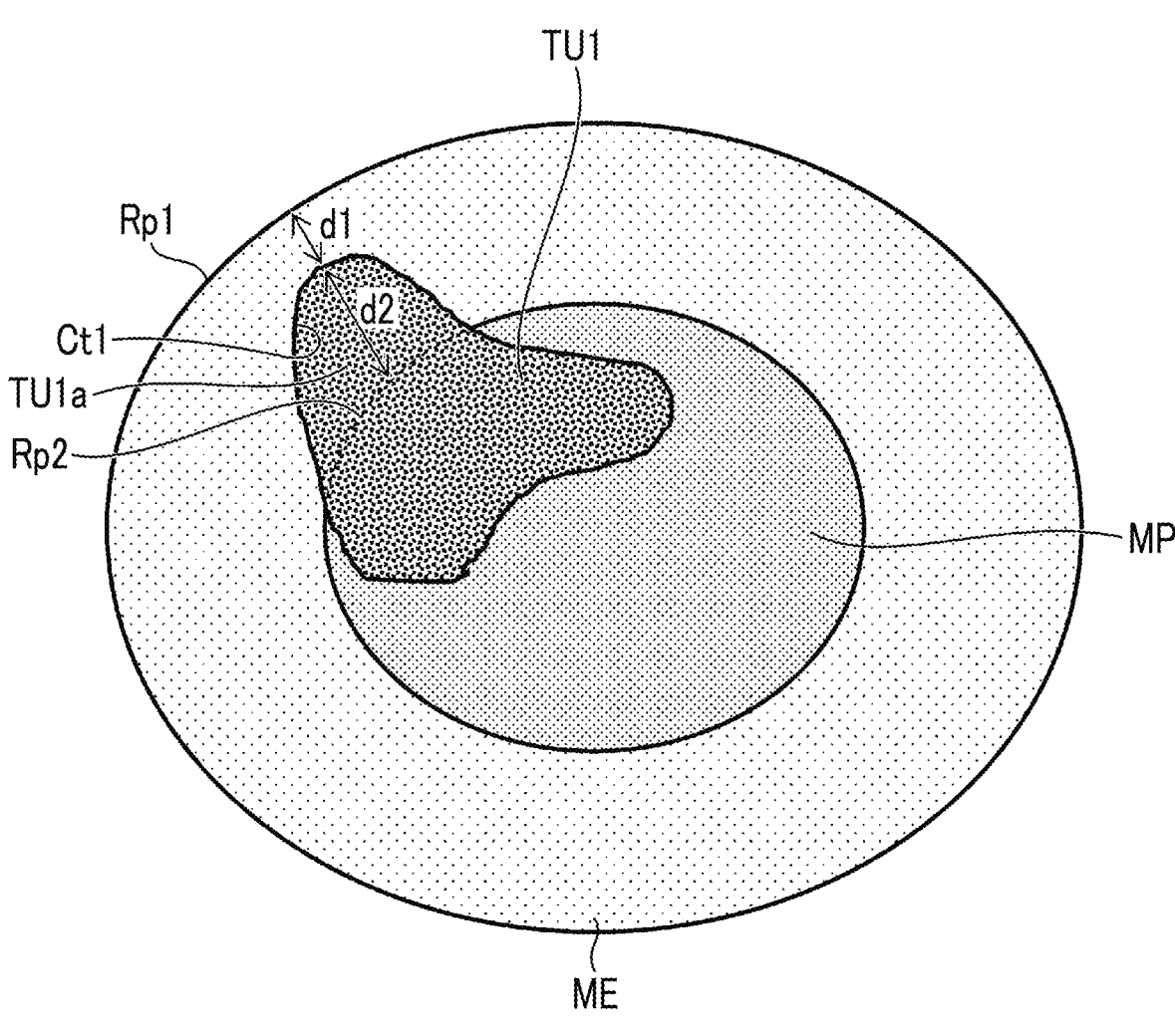
FIG. 14 is a schematic diagram illustrating an example of a cross-section of an MRI image obtained by imaging a rectal cancer.

FIG. 14 is a schematic diagram illustrating an example of a cross-section of an MRI image obtained by imaging a rectal cancer. FIG. 14 illustrates an example of a cancer TU1 that invades beyond the muscularis propria MP. In a case of Example 1 illustrated in FIG. 14, a mesorectal fascia (MRF) surrounding a fat layer of the mesorectum ME outside the cancer TU1 is set on a first measurement reference surface Rp1. In addition, a circumference surface of the muscularis propria MP intersecting with the region of the cancer TU1 is set as a second measurement reference surface Rp2.

In evaluation of the rectal cancer, the presence or absence of invasion to MRF is one of important viewpoints. In a case where the distance between the invading cancer TU1 and the mesorectal fascia is shorter than 1 mm, MRF involved is determined.

In a case of measuring a distance between the cancer TU1 and the first measurement reference surface Rp1, the processor 202 may measure a distance from the first measurement reference surface Rp1 for all points in the region of the cancer TU1, or may extract, as a measurement target region, a portion of the region of the cancer TU1 and measure a distance from the first measurement reference surface Rp1 for points in the extracted target region.

A portion of the region of the cancer TU1 that is regarded as an important portion in measurement for evaluation of the degree of progress of the cancer is a portion that invades beyond the second measurement reference surface Rp2. Therefore, the processor 202 may determine, as a measurement target region, a region TU1a that is inside the first measurement reference surface Rp1 and outside the second measurement reference surface Rp2 in the region of the cancer TU1. In this case, the processor 202 may measure a distance from a point on the first measurement reference surface Rp1 for all points in the region TU1a that invades beyond the second measurement reference surface Rp2. Alternatively, as illustrated in FIG. 6, the processor 202 may extract a contour surface Ct1 of the region TU1a and determine, as a measurement target region, only the contour surface Ct1.

In the processing of extracting the contour surface Ct1 from the region of the cancer TU1, for example, by determining whether an adjacent voxel is a voxel classified as "cancer" or a voxel classified as a normal tissue other than cancer and specifying a set of cancer voxels in contact with a tissue other than the cancer, it is possible to specify a boundary surface (contour surface Ct1) between the cancer TU1 and the normal tissue.

The processor 202 can specify a closest distance d1 and a closest portion by setting the contour surface Ct1 of the region TU1a as the measurement reference region on the cancer TU1 side, measuring a point-to-point distance between a point on the contour surface Ct1 and a point on the first measurement reference surface Rp1, and obtaining a minimum value of the point-to-point distance. The contour surface Ct1 is an example of a "lesion-region-side measurement reference region" in the present disclosure.

Alternatively, the processor 202 can specify a closest distance d1 and a closest portion by setting the entire region TU1a that invades beyond the second measurement reference surface Rp2 as the measurement reference region on the cancer TU1 side and obtaining a minimum value of a point-to-point distance between each point in the region TU1a and a point on the first measurement reference surface Rp1. In this case, the processing of extracting the contour surface Ct1a may not be required. The region TU1a determined as the measurement reference region on the cancer TU1 side is an example of a "lesion-region-side measurement reference region" in the present disclosure. The processor 202 may extract the lesion region required for the measurement only in a region interposed between the first measurement reference surface Rp1 and the second measurement reference surface Rp2.

The same applies to a case of measuring a distance between the cancer TU1 and the second measurement reference surface Rp2. The processor 202 may measure, for all points in the region TU1a that invades beyond the second measurement reference surface Rp2, a distance from the second measurement reference surface Rp2. The processor 202 may extract the contour surface Ct1 as a measurement target region, and measure, for a point in the extracted target region, a distance from the second measurement reference surface Rp2.

For example, the processor 202 can specify a farthest distance d2 and a farthest portion by setting the contour surface Ct1 as the measurement reference region on the cancer TU1 side, measuring a point-to-point distance between a point on the contour surface Ct1 and a point on the second measurement reference surface Rp2, and obtaining a maximum value of the point-to-point distance. Alternatively, the processor 202 can specify a farthest distance d2 and a farthest portion by setting the entire region TU1a that invades beyond the second measurement reference surface Rp2 as the measurement reference region on the cancer TU1 side and obtaining a maximum value of a point-to-point distance between each point in the region TU1a and a point on the second measurement reference surface Rp2.

<<Example 2 of Measurement Target>>

Figure 15:
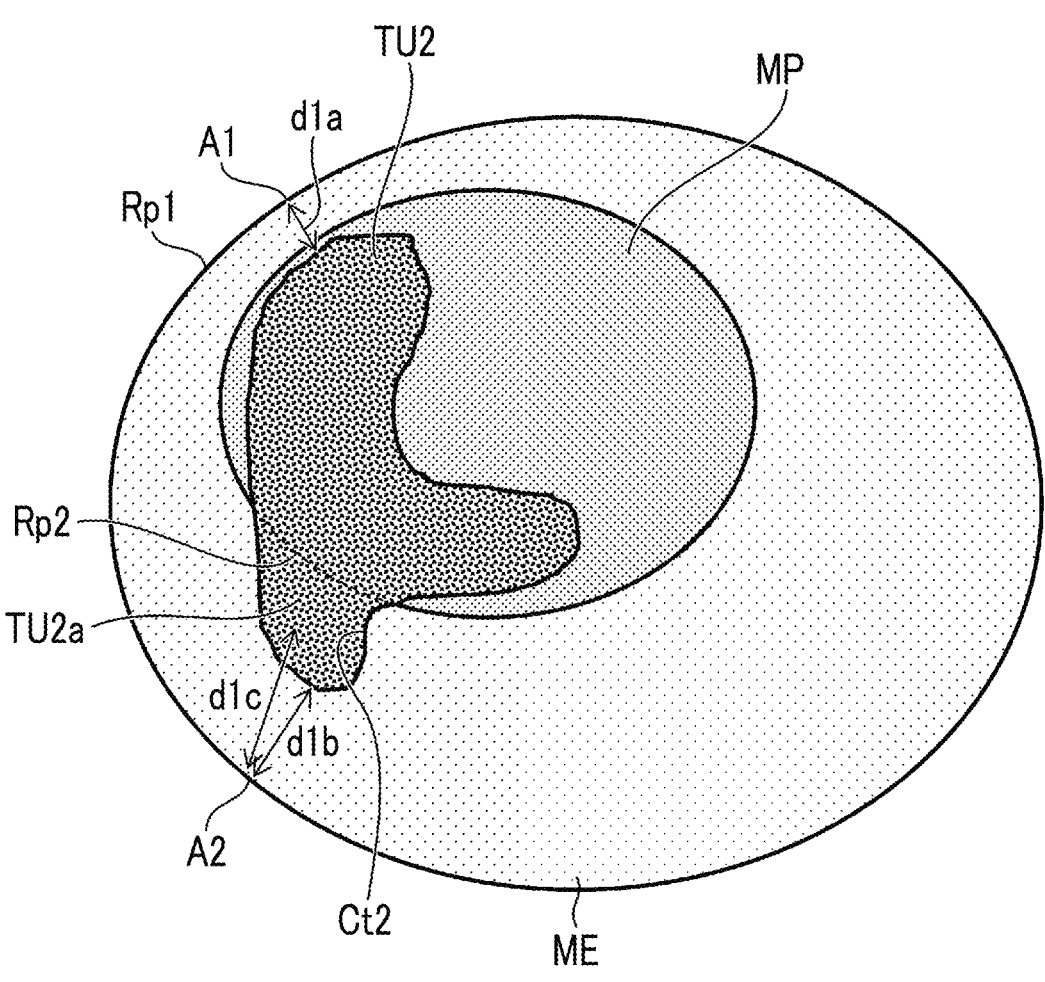
FIG. 15 is a schematic diagram illustrating another example of a cross-section of an MRI image obtained by imaging a rectal cancer.

FIG. 15 is a schematic diagram illustrating another example of a cross-section of an MRI image obtained by imaging a rectal cancer. FIG. 15 illustrates an example of a cancer TU2 that invades beyond the muscularis propria MP. In FIG. 15, the components common to those in FIG. 14 are denoted by the same reference numerals, and redundant description will be omitted.

In a case of Example 2 illustrated in FIG. 15, in the entire region of the cancer TU2, a portion at which a distance from the cancer TU2 to the first measurement reference surface Rp1 is shortest is a portion indicated by a reference numeral A1. However, a shortest distance d1a between the cancer TU2 and the first measurement reference surface Rp1 in the close portion A1 is measured across the second measurement reference surface Rp2. That is, a portion of the region of the cancer TU2 corresponding to the close portion A1 remains in the muscularis propria MP.

On the other hand, a factor that is particularly important in clinical practice is a distance to the first measurement reference surface Rp1 for the region TU2a that invades beyond the muscularis propria MP in the region of the cancer TU2. Therefore, in order to measure this important distance, the processor 202 may be configured to set the region TU2a that is inside the first measurement reference surface Rp1 and outside the second measurement reference surface Rp2 in the region of the cancer TU2 as a measurement target region, and measure a distance between the region TU2a and the first measurement reference surface Rp1.

In this case, the processor 202 may measure a distance from a point on the first measurement reference surface Rp1 for all points in the region TU2a that invades beyond the second measurement reference surface Rp2. Alternatively, the processor 202 may extract a contour surface Ct2 of the region TU2a and determine, as a measurement target region, only the contour surface Ct2.

The processor 202 can specify a closest distance d1b and a closest portion A2 by setting the contour surface Ct2 as the measurement reference region on the cancer TU2 side, measuring a point-to-point distance between a point on the contour surface Ct2 and a point on the first measurement reference surface Rp1, and obtaining a minimum value of the point-to-point distance. The contour surface Ct2 is an example of a "lesion-region-side measurement reference region" in the present disclosure.

Alternatively, the processor 202 can specify a closest distance d1b and a closest portion A2 by setting the entire region TU2a that invades beyond the second measurement reference surface Rp2 as the measurement reference region on the cancer TU2 side and obtaining a minimum value of a point-to-point distance d1c between each point in the region TU2a and a point on the first measurement reference surface Rp1. The region TU2a determined as the measurement reference region on the cancer TU2 side is an example of a "lesion-region-side measurement reference region" in the present disclosure.

<<Display Aspect of Measurement Result>>

Although FIG. 9 to FIG. 11 illustrate an example in which a numerical value indicating a distance is displayed as a display example of the measurement result, the display aspect of the measurement result is not limited to display of the numerical value. For example, the following display aspects may be adopted instead of or in combination with display of the numerical value.

[Display Aspect 1] The display of the measurement result may be a display such as a color map representing a distance using colors. For example, red indicates a closest distance, and blue indicates a farther distance. In this way, distance information may be displayed using a color map in which a relationship between colors and distances is defined such that the perspective of the distance is represented by colors that change steplessly or stepwise from red to blue. In a case of displaying two points at which the closest distance or the farthest distance is measured, the processor 202 may display the measurement portions by changing the color according to the distance.

[Display Aspect 2] The display of the measurement result may be a display of information indicating a determination result as to whether or not the measured distance exceeds a threshold value. For example, a first threshold value is preset for a distance between the first measurement reference surface Rp1 which is set outside the lesion region and the lesion region. The processor 202 may display a warning in a case where the distance between the lesion region and the first measurement reference surface Rp1 is shorter than the first threshold value. In addition, the processor 202 may visually differentiate and display all the portions or regions having a distance shorter than the first threshold value. In a case of CRM, the first threshold value may be set to 1 mm. In a case where the distance between the cancer TU and the mesorectum ME is shorter than 1 mm, the processor 202 may perform display control to enhance an alerting effect, such as a highlight display, a blinking display, or a display with a thick line. In a case where a portion having a distance shorter than the first threshold value does not exist, the processor 202 may display the fact or may not display the determination result.

Similarly, for example, a second threshold value is preset for a distance between the second measurement reference surface Rp2 intersecting with the lesion region and the lesion region, and the processor 202 may display a warning in a case where the distance between the lesion region and the second measurement reference surface Rp2 is equal to or longer than the second threshold value. In addition, the processor 202 may visually differentiate and display all the portions or regions having a distance equal to or longer than the second threshold value. In a case of the extramural depth of tumor invasion, values of a plurality of levels corresponding to classification of the stages may be set as the second threshold value.

In a case where the extramural depth of tumor invasion is equal to or longer than the second threshold value, the processor 202 may perform display control such as a highlight display, a blinking display, or a display with a thick line to enhance an alerting effect, or may display categories classified based on the second threshold value. A warning display, a differentiated display, a category display, or an appropriate combination of these displays based on a determination result of determination using a threshold value of the first threshold value and/or the second threshold value is an example of "information indicating a determination result as to whether or not the distance exceeds a threshold value" in the present disclosure.

The processor 202 may implement, as display aspects of the measurement result, a plurality of types of display aspects such as an aspect of displaying a numerical value, an aspect of displaying a color by a color map, an aspect of displaying information indicating a determination result of determination using a threshold value, or an appropriate combination aspect of these display aspects. The processor 202 may receive an input of an instruction for designating the display aspect of the measurement result, and may change the display aspect in response to the input instruction.

<<Other Specific Examples of User Interface>>

Figure 16:
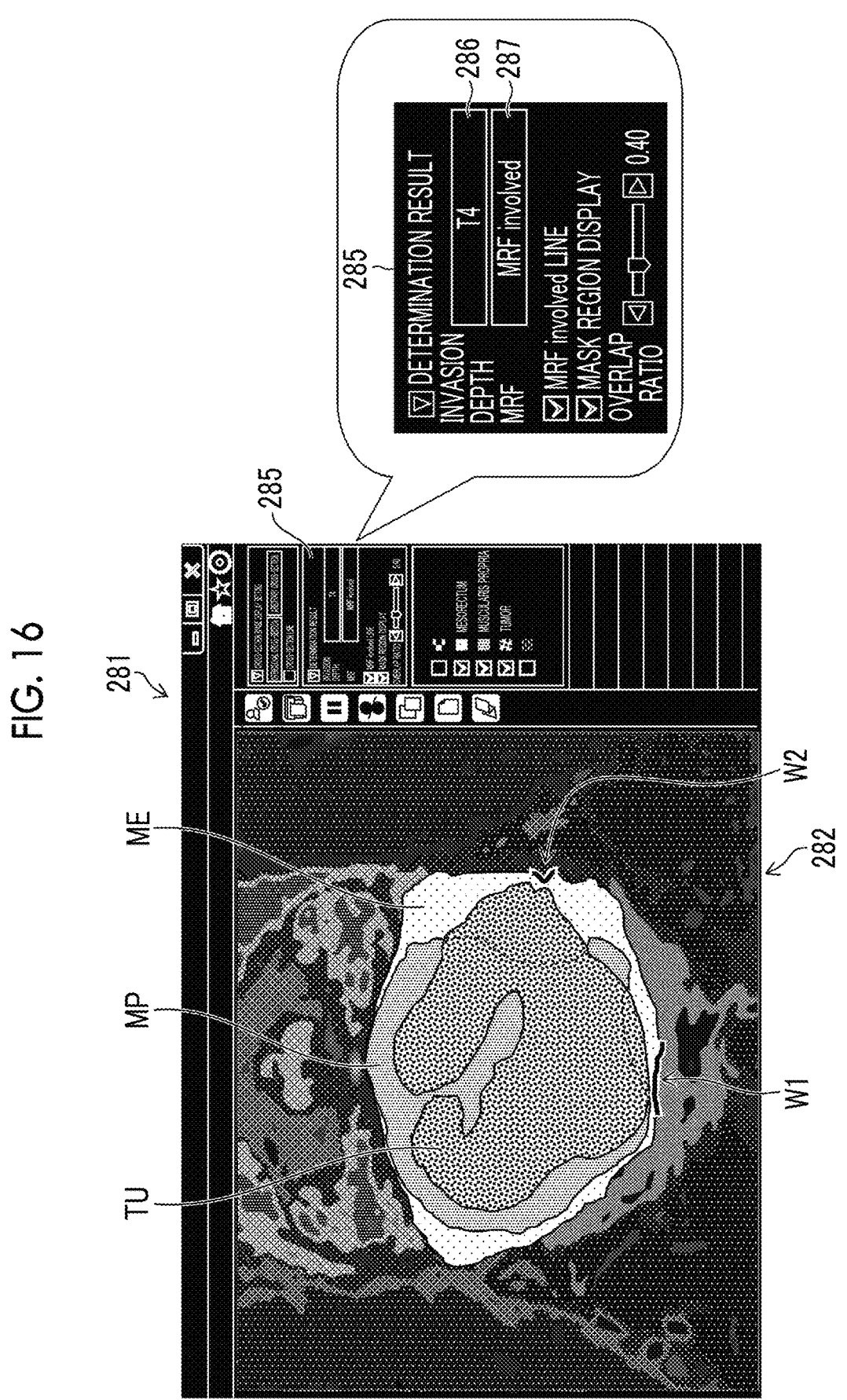
FIG. 16 is another example of a display screen displayed using the medical image processing apparatus according to the embodiment.

FIG. 16 is another example of a display screen displayed using the medical image processing apparatus 20. FIG. 16 illustrates an example of a display screen in a case where a determination result of MRF involved is obtained. A display window 281 illustrated in FIG. 16 includes a determination result display area 285 on a right side of the main display area 282.

In the example of FIG. 16, an axial cross-section image is displayed in the main display area 282, and each region of the mesorectum ME, the muscularis propria MP, and the cancer TU is displayed as a mask region. In addition, MRF invasion lines W1 and W2 indicating portions at which the distance between the cancer TU and the MRF is shorter than 1 mm are displayed in the main display area 282. In FIG. 16, the MRF invasion lines W1 and W2 are drawn with thick lines along the outer circumference surface of the mesorectum ME. The MRF invasion lines W1 and W2 may be displayed in red or the like, or may be displayed in a blinking manner. The MRF invasion lines W1 and W2 are drawn with thick lines along the outer circumference surface of the mesorectum ME.

The determination result display area 285 is an area for displaying information indicating a result of determination using the threshold value, and includes an invasion depth display area 286 and an MRF invasion evaluation display area 287, the determination result being obtained by comparing the measured distance with the threshold value. In the invasion depth display area 286, invasion depth categories which are classified based on the determination using the threshold value are displayed. The presence or absence of MRF invasion is displayed in the MRF invasion evaluation display area 287.

In a case of displaying the measurement result as illustrated in FIG. 16, it is not always necessary to specify a portion at which the distance between the cancer TU and the MRF is shortest or to obtain a minimum value of the distance. On the other hand, it is clear that the minimum value (closest distance) is included in the measured values determined as the distance shorter than the threshold value. It is understood that the display of the MRF invasion lines W1 and W2 is a display including information on the closest distance and the closest portion.

Advantages According to Present Embodiment

The medical image processing apparatus 20 according to the embodiment has the following advantages.

[1] According to the medical image processing apparatus 20, it is possible to adaptively select an appropriate measurement reference surface for lesion evaluation according to the positional relationship between the lesion region and the surrounding tissue, and measure a three-dimensional distance. In addition, according to the medical image processing apparatus it is possible to display the distance information indicating the measurement result on the medical image such as an actual MRI image. Thereby, it is possible to easily recognize the actual positional relationship between the lesion and the surrounding tissue.

[2] The medical image processing apparatus 20 can automatically measure a distance of a three-dimensional close portion on the input medical image. Thereby, oversight of the three-dimensional close portion is prevented.

[3] In clinical practice, measurement in units of 1 mm is required. Therefore, according to the medical image processing apparatus 20, measurement can be performed without an error between measurers. Thereby, statistical evaluation can be easily performed.

[4] In addition to the main cancer (primary lesion) that is automatically extracted, in a case where a doctor inputs a portion that is suspected as lymph node metastasis or blood vessel invasion by using the input device 214 or the like, it is possible to measure a distance and display a measurement result.

[5] According to the medical image processing apparatus 20, in a case of making a resection plan or the like, it is possible to examine a validity of the resection surface while checking the distance between the resection surface and the lesion region on the medical image. Further, according to the medical image processing apparatus 20, a doctor can freely designate not only an anatomically-existing surface but also a virtual surface (non-existing surface) as a measurement reference surface.

Others

In the embodiment of the present invention described above, changes, additions, or deletions can be appropriately made without departing from the spirit of the present invention. The present invention is not limited to the embodiment described above, and many modifications can be made by those skilled in the art within a technical scope of the present invention.

EXPLANATION OF REFERENCES

20: Medical image processing apparatus
22: Image acquisition unit
30 Modality
31: CT apparatus
32: MRI apparatus
33: Ultrasound diagnosis apparatus
34: PET apparatus
35 X-ray diagnosis apparatus
36: X-ray fluoroscopy diagnosis apparatus
37: Endoscope apparatus
40 DICOM server
46: Viewer terminal
48: Communication line
100: Medical information system
202: Processor
204: Computer-readable medium
206: Communication interface
208: Input/output interface
210: Bus

214: Input device
216: Display device
220: Medical image processing program
222: Image acquisition unit
224: Lesion region extraction unit
226: Lesion region input reception unit
228: Measurement reference surface extraction unit
230: Measurement reference surface input reception unit
232: Distance measurement unit
234: Display image generation unit
260: Display control program
280, 281: Display window
282: Main display area
284a: Sub-display area
284b: Sub-display area
284c: Sub-display area
285: Determination result display area
286: Invasion depth display area
TU, TU1, TU2: Cancer
TU1a, TU2a: region
C1a: Contour surface
C1b: Contour surface
Ct1, Ct2: Contour surface
d1: Closest distance
d2: Farthest distance
A1: Close portion
d1a: Shortest distance
d1b: Closest distance
A2: Closest portion
d1c: Distance between points
IM1: Image
LA: A layer
LB: B layer
LC: C layer
ME: Mesorectum
MP: muscularis propria
POR: Surrounding organ
Rp1: First measurement reference surface
Rp2: Second measurement reference surface
Rp2a, Rp2b: Measurement reference surface
P1, P2: Point
S12 to S30: Steps of illustrating operation of medical image processing apparatus

What is claimed is:

1. A medical image processing apparatus comprising:
a processor; and
a memory that stores a program to be executed by the processor,
wherein the processor is configured to: by executing a command of the program,
acquire a three-dimensional medical image,
receive an input of information indicating a lesion region included in the medical image,
determine, from the medical image, a measurement reference surface serving as a measurement reference for lesion evaluation,
three-dimensionally measure a distance between the lesion region and the measurement reference surface,
in response to a first measurement reference surface outside a lesion region being determined as the measurement reference surface, display a measurement result including information indicating a closest distance between the lesion region and the measurement reference surface together with the medical image; and
in response to a second measurement reference surface intersecting with the lesion region being determined as the measurement reference surface, display another measurement result including information indicating a farthest distance between the lesion region and the measurement reference surface.

2. The medical image processing apparatus according to claim 1, wherein the processor further displays information indicating a closest portion between the first measurement reference surface and the lesion region in response to the first measurement reference surface being determined as the measurement reference surface.

3. The medical image processing apparatus according to claim 1, wherein the processor further displays information indicating a farthest portion between a portion of the lesion region that invades beyond the second measurement reference surface and the second measurement reference surface in response to the second measurement reference surface being determined as the measurement reference surface.

4. The medical image processing apparatus according to claim 1, wherein the processor is configured to:

determine, from the lesion region, a lesion-region-side measurement reference region serving as a lesion-region-side reference of the measurement for the lesion evaluation, and measure a distance between the lesion-region-side measurement reference region and the measurement reference surface.

5. The medical image processing apparatus according to claim 4, wherein the lesion-region-side measurement reference region is a partial region of the lesion region.

6. The medical image processing apparatus according to claim 4, wherein the lesion-region-side measurement reference region is a region corresponding to at least a portion of an outer circumference surface of the lesion region.

7. The medical image processing apparatus according to claim 4, wherein the processor is configured to:

display, in a case where a distance between the first measurement reference surface and the lesion-region-side measurement reference region is shorter than a first threshold value, information indicating that the distance is shorter than the first threshold value together with the medical image.

8. The medical image processing apparatus according to claim 4, wherein the processor is configured to:

display, for a portion at which a distance between the second measurement reference surface and the lesion-region-side measurement reference region is equal to or longer than a second threshold value, information indicating that the distance is equal to or longer than the second threshold value together with the medical image.

9. The medical image processing apparatus according to claim 1, wherein the processor is configured to:

determine, from a region that is included in the lesion region and is inside the first measurement reference surface and outside the second measurement reference surface, a lesion-region-side measurement reference region serving as a lesion-region-side reference of the measurement for the lesion evaluation, and measure a distance between at least one of the first measurement reference surface or the second measurement reference surface and the lesion-region-side measurement reference region.

10. The medical image processing apparatus according to claim 9, wherein the processor is configured to:

measure a distance between the first measurement reference surface and the lesion-region-side measurement reference region, and display the measurement result including information indicating the closest distance between the first measurement reference surface and the lesion-region-side measurement reference region together with the medical image.

11. The medical image processing apparatus according to claim 1, wherein each of the measurement result and the another measurement result includes a numerical value indicating a distance, a color map representing the distance using a color, or information indicating a determination result as to whether or not the distance exceeds a threshold value.

12. The medical image processing apparatus according to claim 1, wherein the processor is configured to:

perform lesion region extraction processing of automatically extracting the lesion region from the medical image, and acquire the information indicating the lesion region.

13. The medical image processing apparatus according to claim 12, wherein the lesion region extraction processing includes processing of extracting the lesion region by performing image segmentation using a model which is trained by machine learning.

14. The medical image processing apparatus according to claim 1, wherein the processor is configured to:

receive an input of the information indicating the lesion region which is designated by using an input device.

15. The medical image processing apparatus according to claim 1, wherein the measurement reference surface is a surface corresponding to a circumference surface of a tissue serving as a reference in determination of a degree of progress of a lesion.

16. The medical image processing apparatus according to claim 1, wherein the processor is configured to:

determine the measurement reference surface to be used for the measurement according to the lesion region from a plurality of measurement reference surface candidates which are available as the measurement reference surface.

17. The medical image processing apparatus according to claim 16, wherein the plurality of measurement reference surface candidates include a surface corresponding to an outer circumference of an anatomical tissue.

18. The medical image processing apparatus according to claim 1, wherein the lesion region is a region of a cancer that develops from epithelial cells, and the processor is configured to:

> select an innermost non-invasion tissue which is a tissue having a region closest to the epithelial cells in a region outside a deepest portion of the cancer, and
>
> determine the measurement reference surface serving as a reference for measurement of the closest distance based on the selected innermost non-invasion tissue.

19. The medical image processing apparatus according to claim 18,

> wherein the processor is configured to:
>
> select an outermost invasion tissue which is a tissue farthest from the epithelial cells among tissues which are invaded by the cancer in a region inside the deepest portion of the cancer, and
>
> determine the measurement reference surface serving as a reference for measurement of the farthest distance based on the selected outermost invasion tissue.

20. The medical image processing apparatus according to claim 1,

> wherein the processor is configured to:
>
> receive an input of information indicating the measurement reference surface which is designated by using an input device.

21. The medical image processing apparatus according to claim 1,

> wherein the processor is configured to:
>
> display a numerical value of the measurement result of the closest distance or a numerical value of the another measurement result of the farthest distance.

22. The medical image processing apparatus according to claim 1,

> wherein the processor is configured to:
>
> display a cross-section image of a plane including two points at which at least one distance of the closest distance or the farthest distance is measured.

23. The medical image processing apparatus according to claim 22,

> wherein the processor is configured to:
>
> generate a cross-section image of a plane including two points at which the closest distance is measured, and display the cross-section image.

24. The medical image processing apparatus according to claim 1,

> wherein the lesion region is a region of a cancer that develops in a hollow organ, and the processor is configured to:

> present, as a recommended cross-section, a plane which passes through two points at which the closest distance is measured and on which a cross-section area of a hollow organ is smallest or a plane which passes through two points at which the closest distance is measured and of which an angle with a centerline of the hollow organ is closest to 90 degrees.

25. The medical image processing apparatus according to claim 24,

> wherein the processor is configured to: after presenting the recommended cross-section,
>
> receive an input of an instruction from a user to designate a plane passing through the two points by using an input device by fixing an axis passing through the two points at which the closest distance is measured, and
>
> generate a cross-section image of the designated plane.

26. A medical image processing method comprising:

> causing a computer to execute:
>
> acquiring a three-dimensional medical image;
>
> receiving an input of information indicating a lesion region included in the medical image;
>
> determining, from the medical image, a measurement reference surface serving as a measurement reference for lesion evaluation;
>
> three-dimensionally measuring a distance between the lesion region and the measurement reference surface;
>
> in response to a first measurement reference surface outside a lesion region being determined as the measurement reference surface, displaying a measurement result including information indicating a closest distance between the lesion region and the measurement reference surface together with the medical image; and
>
> in response to a second measurement reference surface intersecting with the lesion region being determined as the measurement reference surface, displaying another measurement result including information indicating a farthest distance between the lesion region and the measurement reference surface.

27. A non-transitory, tangible computer-readable recording medium on which a program for causing, when read by a computer, the computer to execute the medical image processing method according to claim 26 is recorded.

\* \* \* \* \*